US008796999B2

(12) United States Patent
Toncich et al.

(10) Patent No.: US 8,796,999 B2
(45) Date of Patent: Aug. 5, 2014

(54) WIRELESS POWER TRANSFER FOR LOW POWER DEVICES

(75) Inventors: Stanley S. Toncich, San Diego, CA (US); Ernest T. Ozaki, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 760 days.

(21) Appl. No.: 12/607,845

(22) Filed: Oct. 28, 2009

(65) Prior Publication Data

US 2010/0201314 A1 Aug. 12, 2010

Related U.S. Application Data

(60) Provisional application No. 61/152,204, filed on Feb. 12, 2009.

(51) Int. Cl.

| | |
|---|---|
| ***H02J 7/04*** | (2006.01) |
| ***H02J 7/00*** | (2006.01) |
| ***H04B 1/38*** | (2006.01) |

(52) U.S. Cl.

USPC ............................ 320/155; 320/108; 455/573

(58) Field of Classification Search

USPC ........ 320/108, 155; 455/41.1, 41.3, 269, 270, 455/573; 340/870.31, 870.32

See application file for complete search history.

(56) References Cited

U.S. PATENT DOCUMENTS

| | | | | |
|---|---|---|---|---|
| 8,102,147 | B2 * | 1/2012 | Jung | 320/108 |
| 8,159,090 | B2 * | 4/2012 | Greene et al. | 307/104 |
| 2006/0158152 | A1 | 7/2006 | Taniguchi et al. | |
| 2008/0014897 | A1 * | 1/2008 | Cook et al. | 455/343.1 |
| 2008/0054638 | A1 | 3/2008 | Greene et al. | |
| 2008/0067874 | A1 | 3/2008 | Tseng | |
| 2008/0174267 | A1 | 7/2008 | Onishi et al. | |
| 2008/0315826 | A1 | 12/2008 | Alberth, Jr. et al. | |
| 2009/0140692 | A1 * | 6/2009 | Hwang | 320/108 |

FOREIGN PATENT DOCUMENTS

| | | | |
|---|---|---|---|
| FR | 2646035 | A1 | 10/1990 |
| JP | 2000029576 | A | 1/2000 |
| TW | 200419966 | A | 10/2004 |
| TW | 200722777 | A | 6/2007 |
| TW | 200843452 | A | 11/2008 |
| TW | 200904139 | A | 1/2009 |
| TW | I373869 | B | 10/2012 |
| WO | WO03105308 | | 12/2003 |
| WO | WO2008117221 | A2 | 10/2008 |

OTHER PUBLICATIONS

International Search Report and Written Opinion—PCT/US2010/024154—ISA/EPO—May 26, 2011.

* cited by examiner

*Primary Examiner* — Richard V Muralidar

(74) *Attorney, Agent, or Firm* — Knobbe Martens Olson & Bear, LLP

(57) ABSTRACT

Exemplary embodiments are directed to wireless power transfer to simultaneously recharge power to more than one device and a user interface for setting charging duration. A method of operating a wireless receiver may comprise receiving wireless power with a receive antenna and conveying power from the receive antenna to a chargeable element. The method may further include electrically isolating the receive antenna from the chargeable element upon detecting that the chargeable element is fully-charged.

27 Claims, 20 Drawing Sheets

WIRELESS POWER TRANSFER FOR LOW POWER DEVICES

CLAIM OF PRIORITY UNDER 35 U.S.C. §119

This application claims priority under 35 U.S.C. §119(e) to:

U.S. Provisional Patent Application 61/152,204 entitled "WIRELESS CHARGING OF LOW POWER DEVICES" filed on Feb. 12, 2009, the disclosure of which is hereby incorporated by reference in its entirety.

BACKGROUND

1. Field

The present invention relates generally to wireless charging, and more specifically to devices, systems, and methods related to charging devices and receivers for wireless charging.

2. Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

A variety of low power devices, such as Bluetooth headsets and hearings aids, are on the market today. In a magnetically resonant wireless charging application, it is desired to transfer as much power as possible to a device being charged. For high power capacity devices, like a cellular telephone for example, a high power transfer capability is crucial so that the high power device can be charged in a short period of time. Low power capacity devices however, generally cannot accept high levels of power transfer without significant risk of permanent damage. There is a need for systems, methods, and devices related to charging both high and low power devices while reducing the risk of damage to the low power devices.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
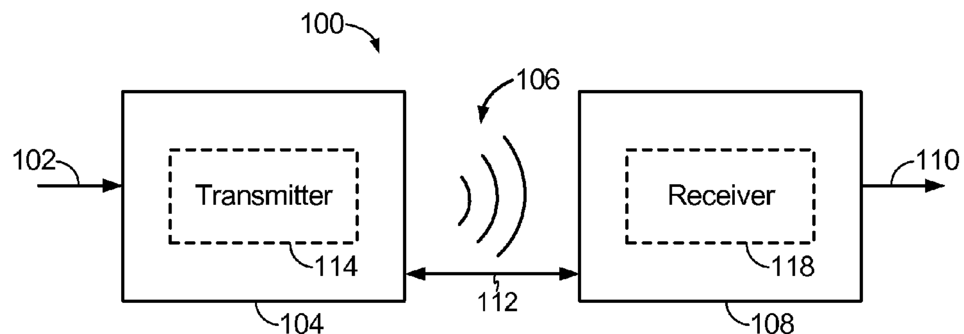
FIG. 1 shows a simplified block diagram of a wireless power transfer system.

FIG. 1 illustrates wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are exactly identical, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
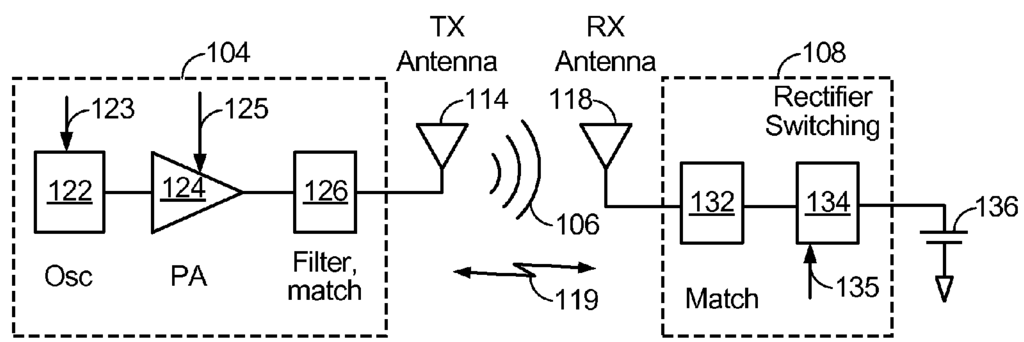
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver may include a matching circuit 132 and a rectifier and switching circuit to generate a DC power output to charge a battery 136 as shown in FIG. 2 or power a device coupled to the receiver (not shown). The matching circuit 132 may be included to match the impedance of the receiver 108 to the receive antenna 118.

Figure 3:
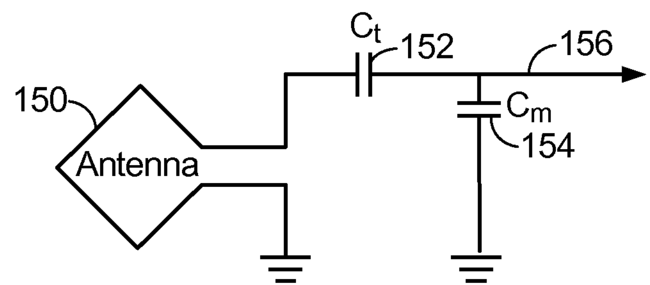
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −0.5 to −4 dB) can be achieved when the Rx antenna on a host device is placed within a coupling-mode region (i.e., in the near-field) of the driven Tx loop antenna.

Figure 4:
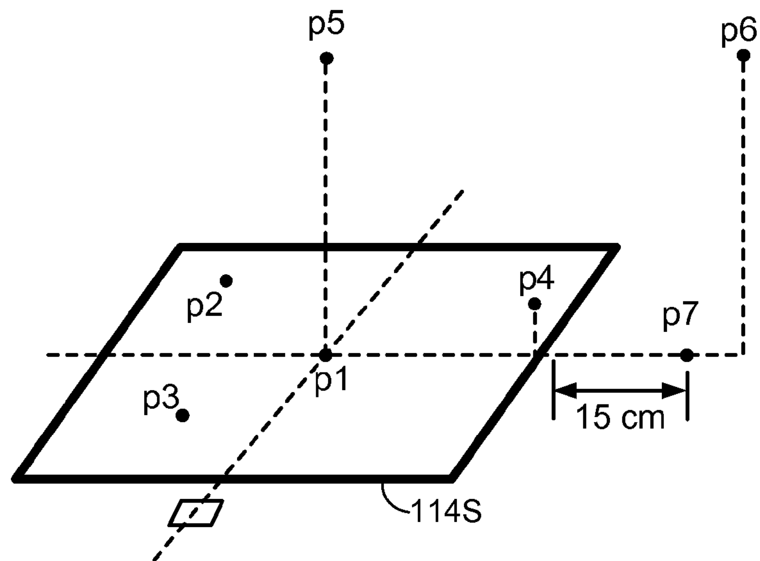
FIG. 4 shows various placement points for a receive antenna relative to a transmit antenna to illustrate coupling strengths in coplanar and coaxial placements.

FIG. 4 shows various placement points for a receive antenna relative to a transmit antenna to illustrate coupling strengths in coplanar and coaxial placements. "Coplanar," as used herein, means that the transmit antenna and receive antenna have planes that are substantially aligned (i.e., have surface normals pointing in substantially the same direction) and with no distance (or a small distance) between the planes of the transmit antenna and the receive antenna. "Coaxial," as used herein, means that the transmit antenna and receive antenna have planes that are substantially aligned (i.e., have surface normals pointing in substantially the same direction) and the distance between the two planes is not trivial and furthermore, the surface normal of the transmit antenna and the receive antenna lie substantially along the same vector, or the two normals are in echelon.

As examples, points p1, p2, p3, and p7 are all coplanar placement points for a receive antenna relative to a transmit antenna. As another example, point p5 and p6 are coaxial placement points for a receive antenna relative to a transmit antenna. The table below shows coupling strength (S21) and coupling efficiency (expressed as a percentage of power transmitted from the transmit antenna that reached the receive antenna) at the various placement points (p1-p7) illustrated in FIG. 8.

TABLE 1

| Position | Distance from plane (cm) | S21 efficiency (%) | Efficiency (TX DC power in to RX DC power out) |
|---|---|---|---|
| p1 | 0 | 46.8 | 28 |
| p2 | 0 | 55.0 | 36 |
| p3 | 0 | 57.5 | 35 |
| p4 | 2.5 | 49.0 | 30 |
| p5 | 17.5 | 24.5 | 15 |
| p6 | 17.5 | 0.3 | 0.2 |
| p7 | 0 | 5.9 | 3.4 |

As can be seen, the coplanar placement points p1, p2, and p3, all show relatively high coupling efficiencies. Placement point p7 is also a coplanar placement point, but is outside of the transmit loop antenna. While placement point p7 does not have a high coupling efficiency, it is clear that there is some coupling and the coupling-mode region extends beyond the perimeter of the transmit loop antenna.

Placement point p5 is coaxial with the transmit antenna and shows substantial coupling efficiency. The coupling efficiency for placement point p5 is not as high as the coupling efficiencies for the coplanar placement points. However, the coupling efficiency for placement point p5 is high enough that substantial power can be conveyed between the transmit antenna and a receive antenna in a coaxial placement.

Placement point p4 is within the circumference of the transmit antenna but at a slight distance above the plane of the transmit antenna in a position that may be referred to as an offset coaxial placement (i.e., with surface normals in substantially the same direction but at different locations) or offset coplanar (i.e., with surface normals in substantially the same direction but with planes that are offset relative to each other). From the table it can be seen that with an offset distance of 2.5 cm, placement point p4 still has relatively good coupling efficiency.

Placement point p6 illustrates a placement point outside the circumference of the transmit antenna and at a substantial distance above the plane of the transmit antenna. As can be seen from the table, placement point p7 shows little coupling efficiency between the transmit and receive antennas.

Figure 5:
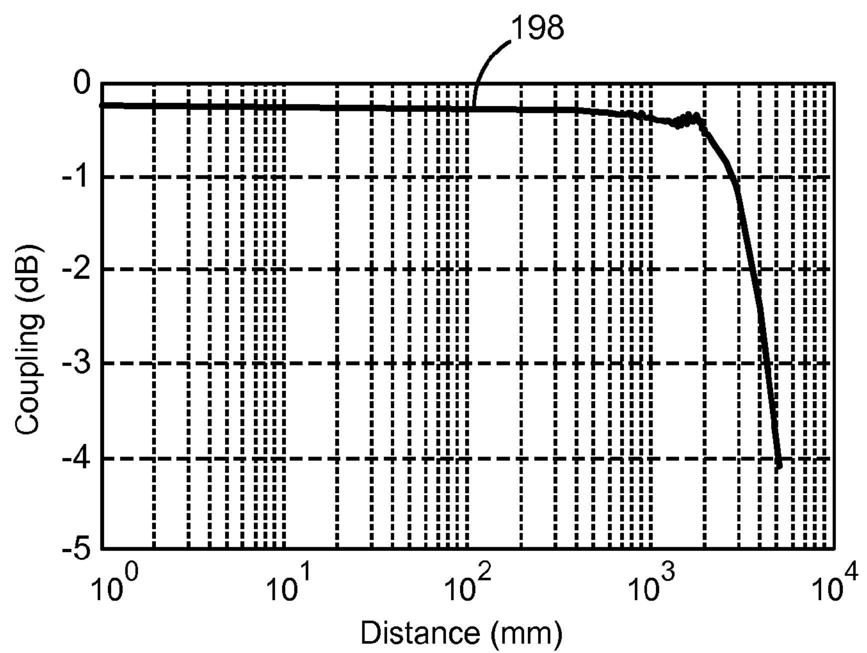
FIG. 5 shows simulation results indicating coupling strength for coaxial placement at various distances between the transmit and receive antennas.

FIG. 5 shows simulation results indicating coupling strength for coaxial placement at various distances between the transmit and receive antennas. The simulations for FIG. 5 are for square transmit and receive antennas in a coaxial placement, both with sides of about 1.2 meters and at a transmit frequency of 10 MHz. It can be seen that the coupling strength remains quite high and uniform at distances of less than about 0.5 meters.

Figure 6:
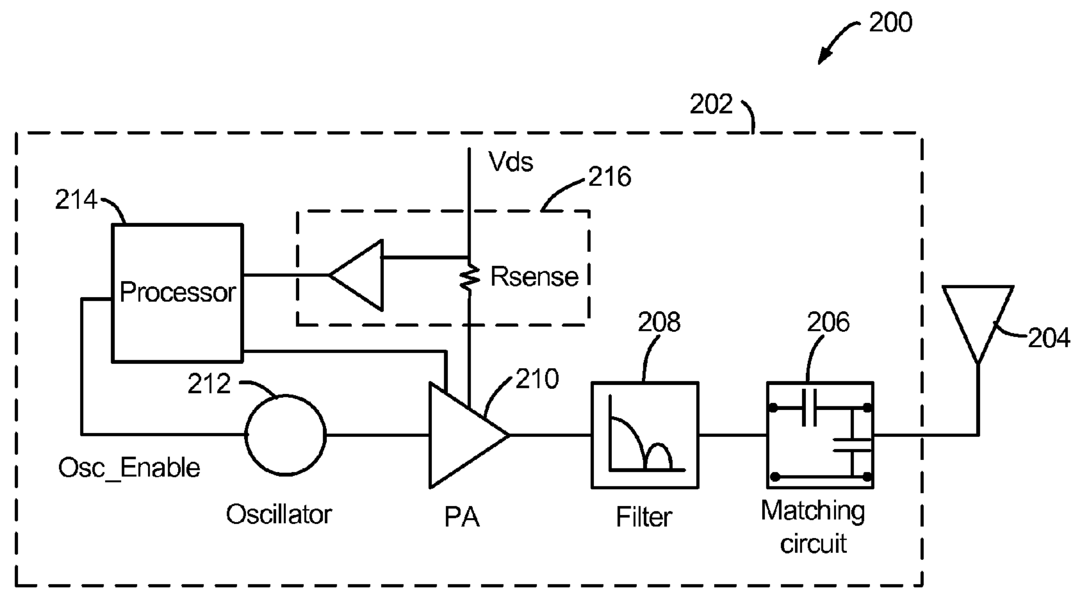
FIG. 6 is a simplified block diagram of a transmitter, in accordance with an exemplary embodiment of the present invention.

FIG. 6 is a simplified block diagram of a transmitter, in accordance with an exemplary embodiment of the present invention. A transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a processor 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by processor 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

Figure 7:
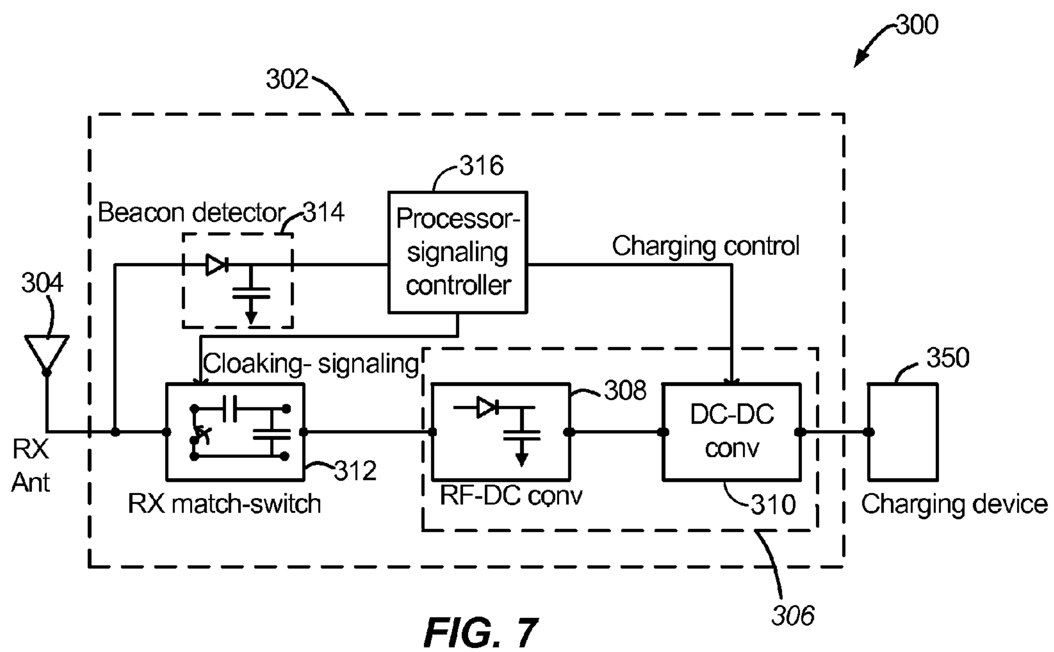
FIG. 7 is a simplified block diagram of a receiver, in accordance with an exemplary embodiment of the present invention.

FIG. 7 is a block diagram of a receiver, in accordance with an exemplary embodiment of the present invention. A receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 6). Receive antenna 304 may be similarly dimensioned with transmit antenna 204 or may be differently sized based upon the dimensions of an associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2) as is explained more fully below. As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be de-tuned in order to eliminate coupling to other nearby receivers or to reduce loading on nearby transmitters. This "de-tuning" of a receiver is also known herein as a "cloaking" Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a Device Sensing and Charging Control Mechanism, rather than conventional two-way communication. In other words, the transmitter uses on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 8:
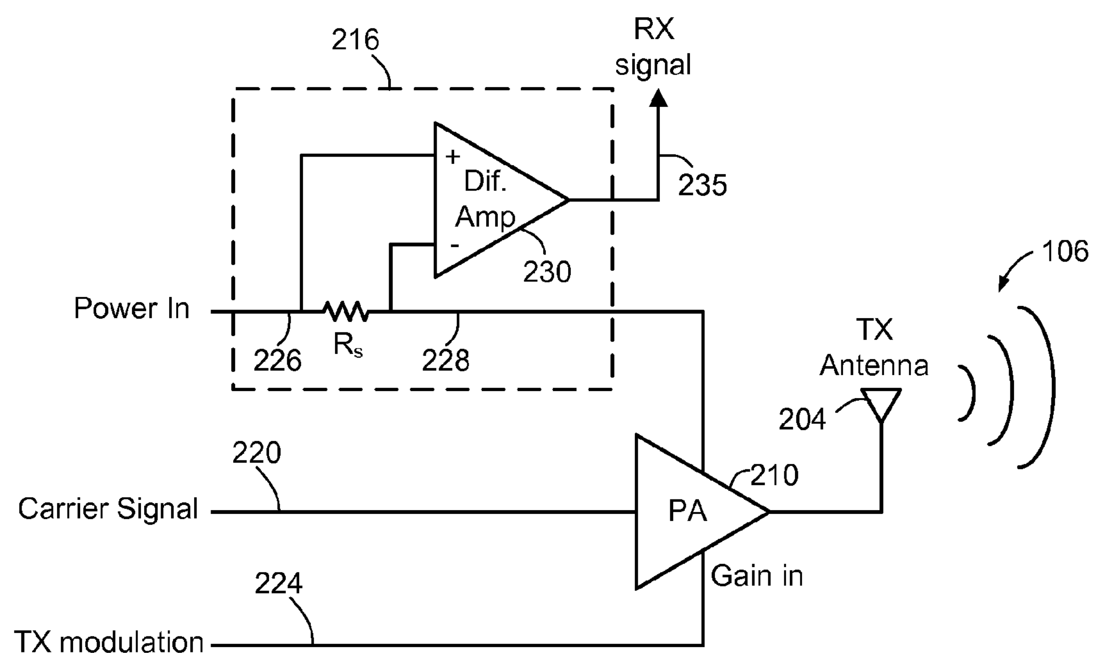
FIG. 8 shows a simplified schematic of a portion of transmit circuitry for carrying out messaging between a transmitter and a receiver.

FIG. 8 shows a simplified schematic of a portion of transmit circuitry for carrying out messaging between a transmitter and a receiver. In some exemplary embodiments of the present invention, a means for communication may be enabled between the transmitter and the receiver. In FIG. 8 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210.

In other words, when the transmit modulation signal 224 is asserted, the power amplifier 210 will drive the amplitude of the carrier signal 220 to its maximum level out on the transmit antenna 204. When the transmit modulation signal 224 is negated, the power amplifier will not drive the amplitude of the carrier signal to a pre-determined minimum level on the transmit antenna 204. The minimum level may be selected to be zero (0% amplitude modulation) or some other, small value, such as ten percent (10%) of the maximum output signal amplitude, as an example. Besides the binary signaling scheme described here (two states, either minimum or maximum amplitude), multi-level signaling may be used, as anyone of ordinary skill in the art would understand. Other signaling techniques may be employed as well, such as encoding information in the carrier's phase and/or frequency (phase or frequency modulation).

The transmit circuitry of FIG. 8 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 8) the amount of current drawn by the power amplifier 210 will change. In other words, if no coupled mode resonance exist for the transmit antenna 210, the power required to drive the radiated field will be first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna, as explained below. Additionally, a change in receiver current draw will be observable in the transmitter's power amplifier current draw, and this change can be used to detect signals from the receive antennas, as explained below.

Figure 9A:
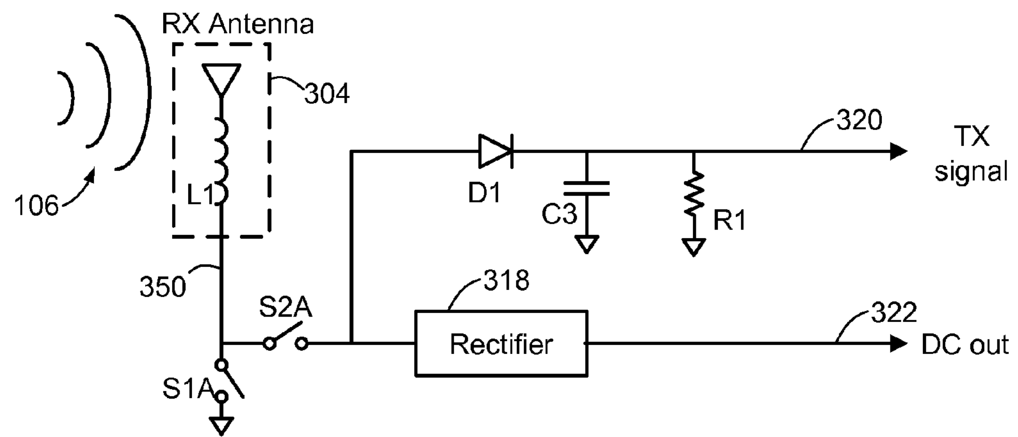
FIGS. 9A-9C shows a simplified schematic of a portion of receive circuitry in various states to illustrate messaging between a receiver and a transmitter.
Figure 9B:
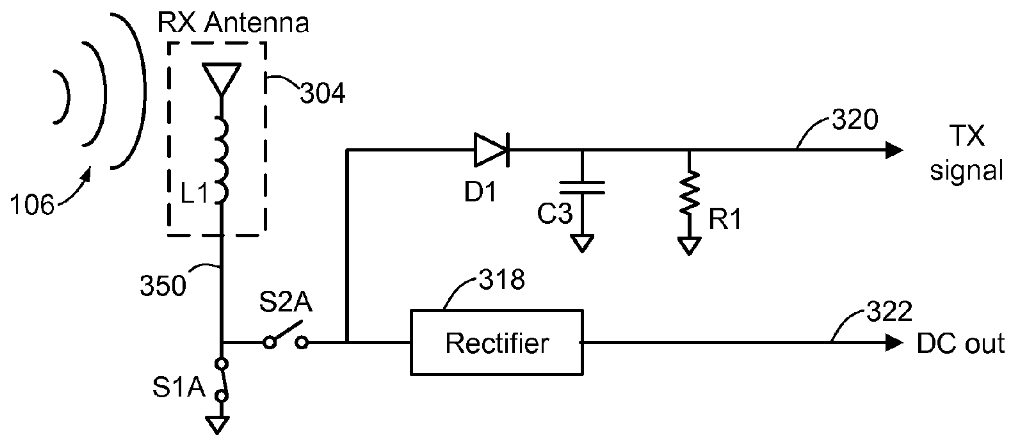
Figure 9C:
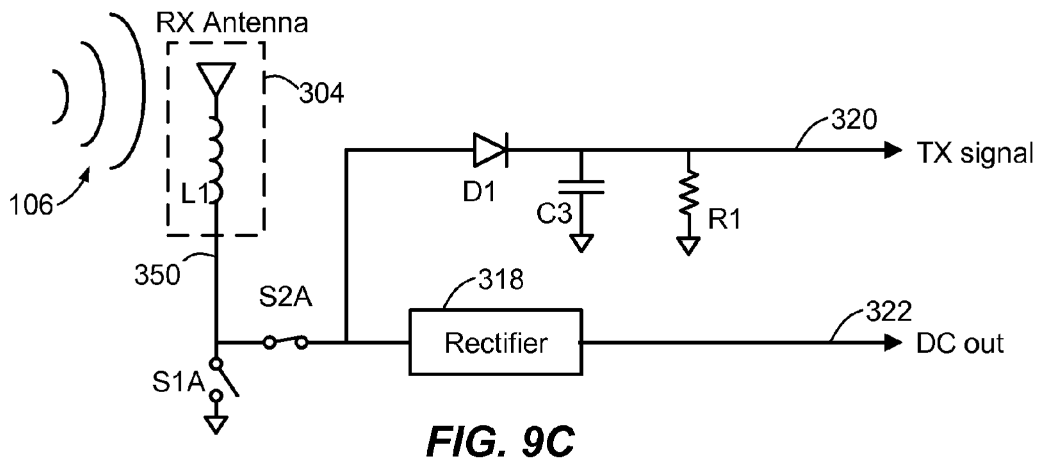

FIGS. 9A-9C shows a simplified schematic of a portion of receive circuitry in various states to illustrate messaging between a receiver and a transmitter. All of FIGS. 9A-9C show the same circuit elements with the difference being state of the various switches. A receive antenna 304 includes a characteristic inductance L1, which drives node 350. Node 350 is selectively coupled to ground through switch S1A. Node 350 is also selectively coupled to diode D1 and rectifier 318 through switch S1B. The rectifier 318 supplies a DC power signal 322 to a receive device (not shown) to power the receive device, charge a battery, or a combination thereof. The diode D1 is coupled to a transmit signal 320 which is filtered to remove harmonics and unwanted frequencies with capacitor C3 and resistor R1. Thus the combination of D1, C3, and R1 can generate a signal on the transmit signal 320 that mimics the transmit modulation generated by the transmit modulation signal 224 discussed above with reference to the transmitter in FIG. 12.

Exemplary embodiments of the invention includes modulation of the receive device's current draw and modulation of the receive antenna's impedance to accomplish reverse link signaling. With reference to both FIG. 9A and FIG. 8, as the power draw of the receive device changes, the load sensing circuit 216 detects the resulting power changes on the transmit antenna and from these changes can generate the receive signal 235.

In the exemplary embodiments of FIGS. 9A-9C, the current draw through the transmitter can be changed by modifying the state of switches S1A and S2A. In FIG. 9A, switch S1A and switch S2A are both open creating a "DC open state" and essentially removing the load from the transmit antenna 204. This reduces the current seen by the transmitter.

In FIG. 9B, switch S1A is closed and switch S2A is open creating a "DC short state" for the receive antenna 304. Thus the state in FIG. 9B can be used to increase the current seen in the transmitter.

In FIG. 9C, switch S1A is open and switch S2A is closed creating a normal receive mode (also referred to herein as a "DC operating state") wherein power can be supplied by the DC out signal 322 and a transmit signal 320 can be detected. In the state shown in FIG. 9C the receiver receives a normal amount of power, thus consuming more or less power from the transmit antenna than the DC open state or the DC short state.

Reverse link signaling may be accomplished by switching between the DC operating state (FIG. 9C) and the DC short state (FIG. 9B). Reverse link signaling also may be accomplished by switching between the DC operating state (FIG. 9C) and the DC open state (FIG. 9A).

Figure 10A:
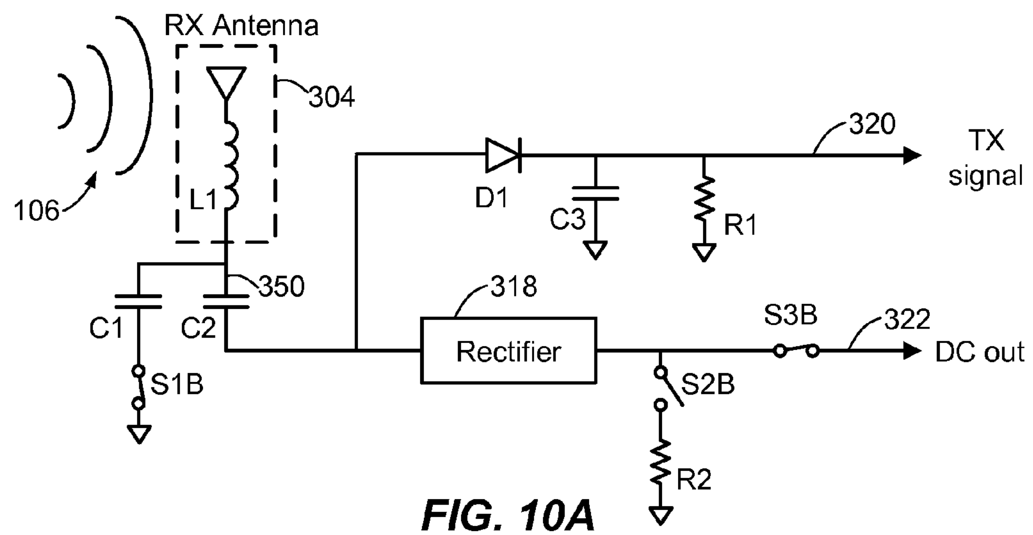
FIGS. 10A-10C shows a simplified schematic of a portion of alternative receive circuitry in various states to illustrate messaging between a receiver and a transmitter.
Figure 10B:
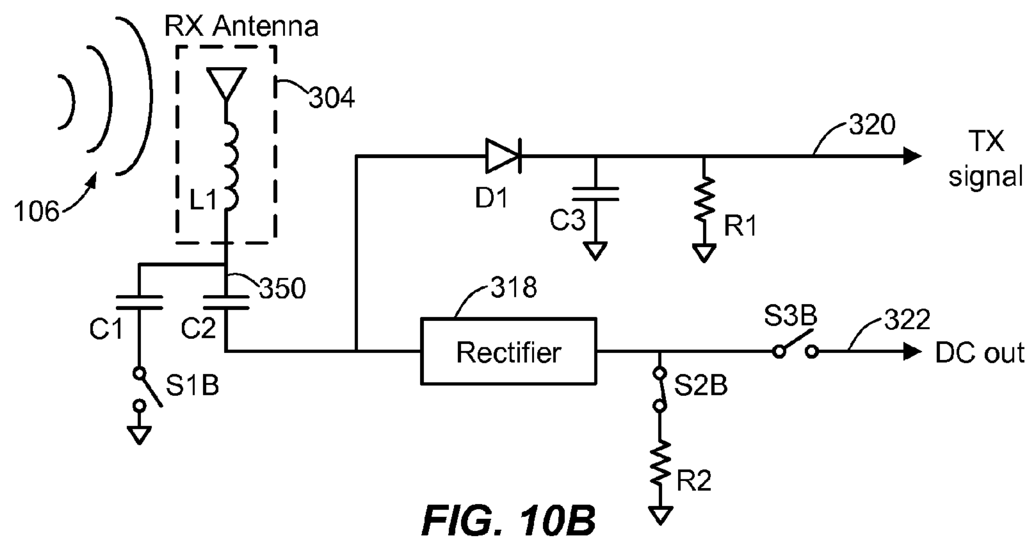
Figure 10C:
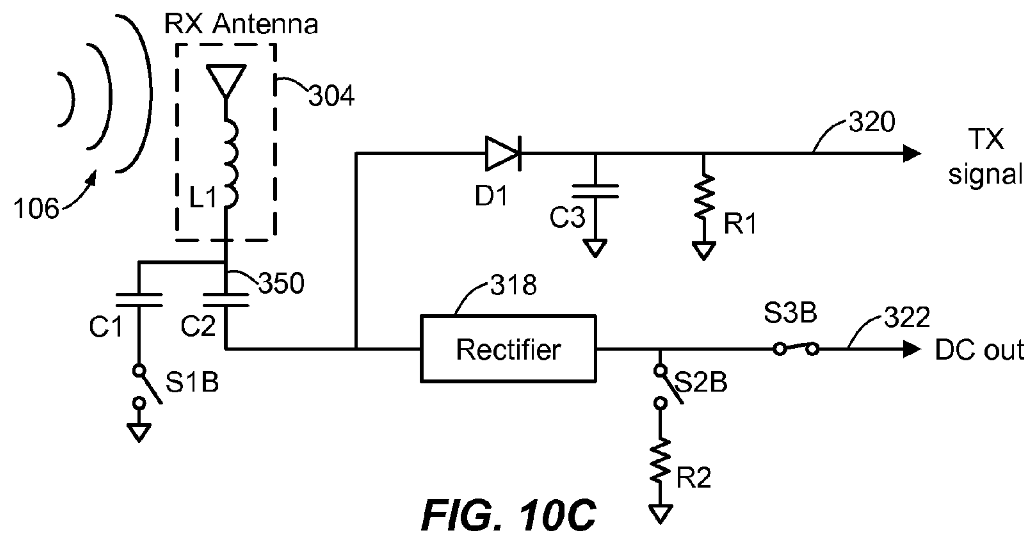

FIGS. 10A-10C shows a simplified schematic of a portion of alternative receive circuitry in various states to illustrate messaging between a receiver and a transmitter.

All of FIGS. 10A-10C show the same circuit elements with the difference being state of the various switches. A receive antenna 304 includes a characteristic inductance L1, which drives node 350. Node 350 is selectively coupled to ground through capacitor C1 and switch S1B. Node 350 is also AC coupled to diode D1 and rectifier 318 through capacitor C2. The diode D1 is coupled to a transmit signal 320 which is filtered to remove harmonics and unwanted frequencies with capacitor C3 and resistor R1. Thus the combination of D1, C3, and R1 can generate a signal on the transmit signal 320 that mimics the transmit modulation generated by the transmit modulation signal 224 discussed above with reference to the transmitter in FIG. 8.

The rectifier 318 is connected to switch S2B, which is connected in series with resistor R2 and ground. The rectifier 318 also is connected to switch S3B. The other side of switch S3B supplies a DC power signal 322 to a receive device (not shown) to power the receive device, charge a battery, or a combination thereof.

In FIGS. 9A-9C the DC impedance of the receive antenna 304 is changed by selectively coupling the receive antenna to ground through switch S1B. In contrast, in the exemplary embodiments of FIGS. 10A-10C, the impedance of the antenna can be modified to generate the reverse link signaling by modifying the state of switches S1B, S2B, and S3B to change the AC impedance of the receive antenna 304. In FIGS. 10A-10C the resonant frequency of the receive antenna 304 may be tuned with capacitor C2. Thus, the AC impedance of the receive antenna 304 may be changed by selectively coupling the receive antenna 304 through capacitor C1 using switch S1B, essentially changing the resonance circuit to a different frequency that will be outside of a range that will optimally couple with the transmit antenna. If the resonance frequency of the receive antenna 304 is near the resonant frequency of the transmit antenna, and the receive antenna 304 is in the near-field of the transmit antenna, a coupling mode may develop wherein the receiver can draw significant power from the radiated field 106.

In FIG. 10A, switch S1B is closed, which de-tunes the antenna and creates an "AC cloaking state," essentially "cloaking" the receive antenna 304 from detection by the transmit antenna 204 because the receive antenna does not resonate at the transmit antenna's frequency. Since the receive antenna will not be in a coupled mode, the state of switches S2B and S3B are not particularly important to the present discussion.

In FIG. 10B, switch S1B is open, switch S2B is closed, and switch S3B is open, creating a "tuned dummy-load state" for the receive antenna 304. Because switch S1B is open, capacitor C1 does not contribute to the resonance circuit and the receive antenna 304 in combination with capacitor C2 will be in a resonance frequency that may match with the resonant frequency of the transmit antenna. The combination of switch S3B open and switch S2B closed creates a relatively high current dummy load for the rectifier, which will draw more power through the receive antenna 304, which can be sensed by the transmit antenna. In addition, the transmit signal 320 can be detected since the receive antenna is in a state to receive power from the transmit antenna.

In FIG. 10C, switch S1B is open, switch S2B is open, and switch S3B is closed, creating a "tuned operating state" for the receive antenna 304. Because switch S1B is open, capacitor C1 does not contribute to the resonance circuit and the receive antenna 304 in combination with capacitor C2 will be in a resonance frequency that may match with the resonant frequency of the transmit antenna. The combination of switch S2B open and switch S3B closed creates a normal operating state wherein power can be supplied by the DC out signal 322 and a transmit signal 320 can be detected.

Reverse link signaling may be accomplished by switching between the tuned operating state (FIG. 10C) and the AC cloaking state (FIG. 10A). Reverse link signaling also may be accomplished by switching between the tuned dummy-load state (FIG. 10B) and the AC cloaking state (FIG. 10A). Reverse link signaling also may be accomplished by switching between the tuned operating state (FIG. 10C) and the tuned dummy-load state (FIG. 10B) because there will be a difference in the amount of power consumed by the receiver, which can be detected by the load sensing circuit in the transmitter.

Of course, those of ordinary skill in the art will recognize that other combinations of switches S1B, S2B, and S3B may be used to create cloaking, generate reverse link signaling and supplying power to the receive device. In addition, the switches S1A and S1B may be added to the circuits of FIGS. 10A-10C to create other possible combinations for cloaking, reverse link signaling, and supplying power to the receive device.

Thus, when in a coupled mode signals may be sent from the transmitter to the receiver, as discussed above with reference to FIG. 8. In addition, when in a coupled mode signals may be sent from the receiver to the transmitter, as discussed above with reference to FIGS. 9A-9C and 10A-10C.

Figure 11A:
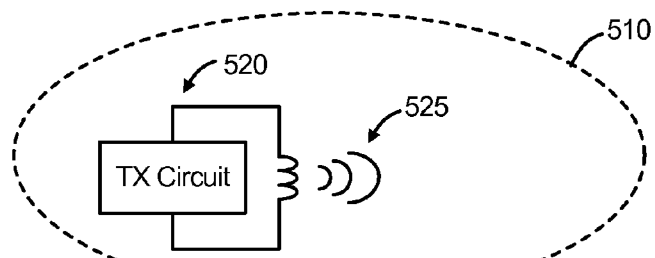
FIGS. 11A-11D are simplified block diagrams illustrating a beacon power mode for transmitting power between a transmitter and a receiver.

FIGS. 11A-11D are simplified block diagrams illustrating a beacon power mode for transmitting power between a transmitter and a one or more receivers. FIG. 11A illustrates a transmitter 520 having a low power "beacon" signal 525 when there are no receive devices in the beacon coupling-mode region 510. The beacon signal 525 may be, as a non-limiting example, such as in the range of ~10 to ~20 mW RF. This signal may be adequate to provide initial power to a device to be charged when it is placed in the coupling-mode region.

Figure 11B:
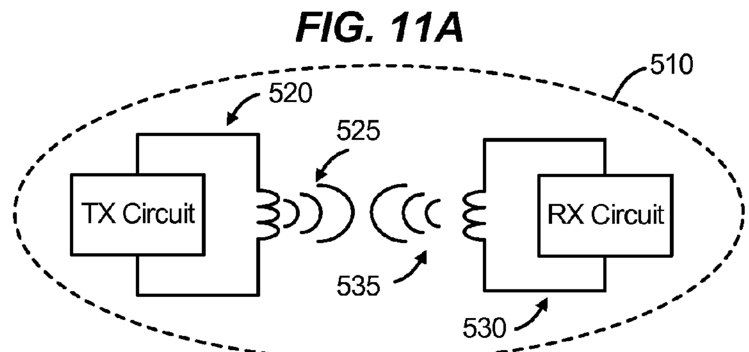

FIG. 11B illustrates a receive device 530 placed within the beacon coupling-mode region 510 of the transmitter 520 transmitting the beacon signal 525. If the receive device 530 is on and develops a coupling with the transmitter it will generate a reverse link coupling 535, which is really just the receiver accepting power from the beacon signal 525. This additional power, may be sensed by the load sensing circuit 216 (FIG. 8) of the transmitter. As a result, the transmitter may go into a high power mode.

Figure 11C:
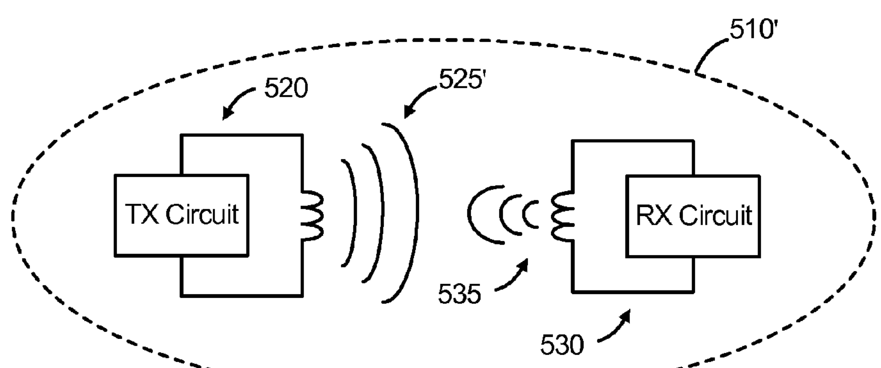

FIG. 11C illustrates the transmitter 520 generating a high power signal 525' resulting in a high power coupling-mode region 510'. As long as the receive device 530 is accepting power and, as a result, generating the reverse link coupling 535, the transmitter will remain in the high power state. While only one receive device 530 is illustrated, multiple receive devices 530 may be present in the coupling-mode region 510. If there are multiple receive device 530 they will share the amount of power transmitted by the transmitter based on how well each receive device 530 is coupled. For example, the coupling efficiency may be different for each receive device 530 depending on where the device is placed within the coupling-mode region 510 as was explained above with reference to FIGS. 4 and 5.

Figure 11D:
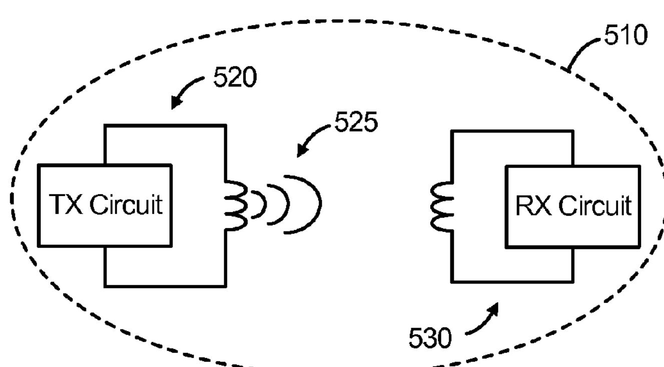

FIG. 11D illustrates the transmitter 520 generating the beacon signal 525 even when a receive device 530 is in the beacon coupling-mode region 510. This state may occur when the receive device 530 is shut off, or the device cloaks itself, perhaps because it does not need any more power.

The receiver and transmitter may communicate on a separate communication channel (e.g., Bluetooth, zigbee, etc). With a separate communication channel, the transmitter may determine when to switch between beacon mode and high power mode, or create multiple power levels, based on the number of receive devices in the coupling-mode region 510 and their respective power requirements.

Exemplary embodiments of the invention include enhancing the coupling between a relatively large transmit antenna and a small receive antenna in the near-field power transfer between two antennas through introduction of additional antennas into the system of coupled antennas that will act as repeaters and will enhance the flow of power from the transmitting antenna toward the receiving antenna.

In exemplary embodiments, one or more extra antennas are used that couple to the transmit antenna and receive antenna in the system. These extra antennas comprise repeater antennas, such as active or passive antennas. A passive antenna may include simply the antenna loop and a capacitive element for tuning a resonant frequency of the antenna. An active element may include, in addition to the antenna loop and one or more tuning capacitors, an amplifier for increasing the strength of a repeated near-field radiation.

The combination of the transmit antenna and the repeater antennas in the power transfer system may be optimized such that coupling of power to very small receive antennas is enhanced based on factors such as termination loads, tuning components, resonant frequencies, and placement of the repeater antennas relative to the transmit antenna.

A single transmit antenna exhibits a finite near-field coupling mode region. Accordingly, a user of a device charging through a receiver in the transmit antenna's near-field coupling mode region may require a considerable user access space that would be prohibitive or at least inconvenient. Furthermore, the coupling mode region may diminish quickly as a receive antenna moves away from the transmit antenna.

A repeater antenna may refocus and reshape a coupling mode region from a transmit antenna to create a second coupling mode region around the repeater antenna, which may be better suited for coupling energy to a receive antenna. Discussed below in FIGS. 12A-14B are some non-limiting examples of embodiments including repeater antennas.

Figure 12A:
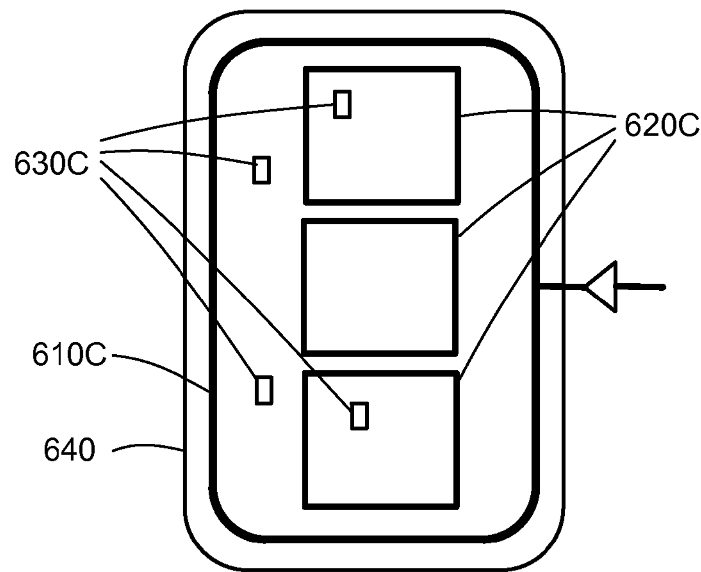
FIG. 12A illustrates a large transmit antenna with a three different smaller repeater antennas disposed coplanar with, and within a perimeter of, the transmit antenna.

FIG. 12A illustrates a large transmit antenna 610C with three smaller repeater antennas 620C disposed coplanar with, and within a perimeter of, the transmit antenna 610C. The transmit antenna 610C and repeater antennas 620C are formed on a table 640. Various devices including receive antennas 630C are placed at various locations within the transmit antenna 610C and repeater antennas 620C. The exemplary embodiment of FIG. 12A may be able to refocus the coupling mode region generated by the transmit antenna 610C into smaller and stronger repeated coupling mode regions around each of the repeater antennas 620C. As a result, a relatively strong repeated near-field radiation is available for the receive antennas 630C. Some of the receive antennas are placed outside of any repeater antennas 620C. Recall that the coupled mode region may extend somewhat outside the perimeter of an antenna. Therefore, receive antennas 630C may be able to receive power from the near-field radiation of the transmit antenna 610C as well as any nearby repeater antennas 620C. As a result, receive antennas placed outside of any repeater antennas 620C, may be still be able to receive power from the near-field radiation of the transmit antenna 610C as well as any nearby repeater antennas 620C.

Figure 12B:
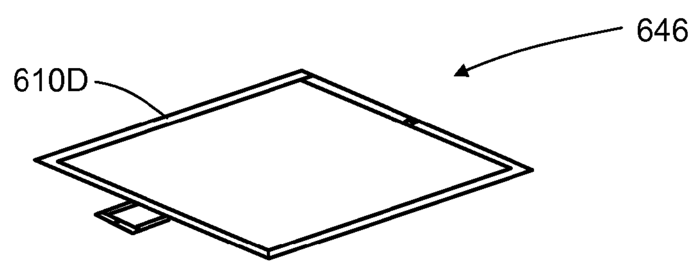
FIG. 12B illustrates a large transmit antenna with smaller repeater antennas with offset coaxial placements and offset coplanar placements relative to the transmit antenna.
Figure 12B:
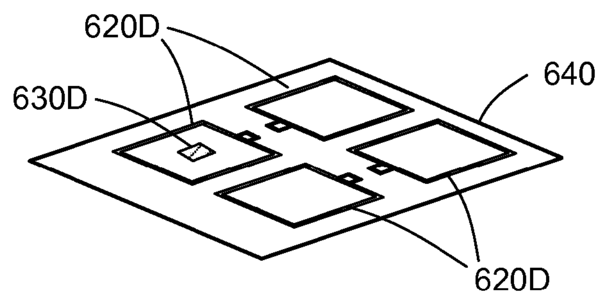

FIG. 12B illustrates a large transmit antenna 610D with smaller repeater antennas 620D with offset coaxial placements and offset coplanar placements relative to the transmit antenna 610D. A device including a receive antenna 630D is placed within the perimeter of one of the repeater antennas 620D. As a non-limiting example, the transmit antenna 610D may be disposed on a ceiling 646, while the repeater antennas 620D may be disposed on a table 640. The repeater antennas 620D in an offset coaxial placement may be able to reshape and enhance the near-field radiation from the transmitter antenna 610D to repeated near-field radiation around the repeater antennas 620D. As a result, a relatively strong repeated near-field radiation is available for the receive antenna 630D placed coplanar with the repeater antennas 620D.

Figure 13:
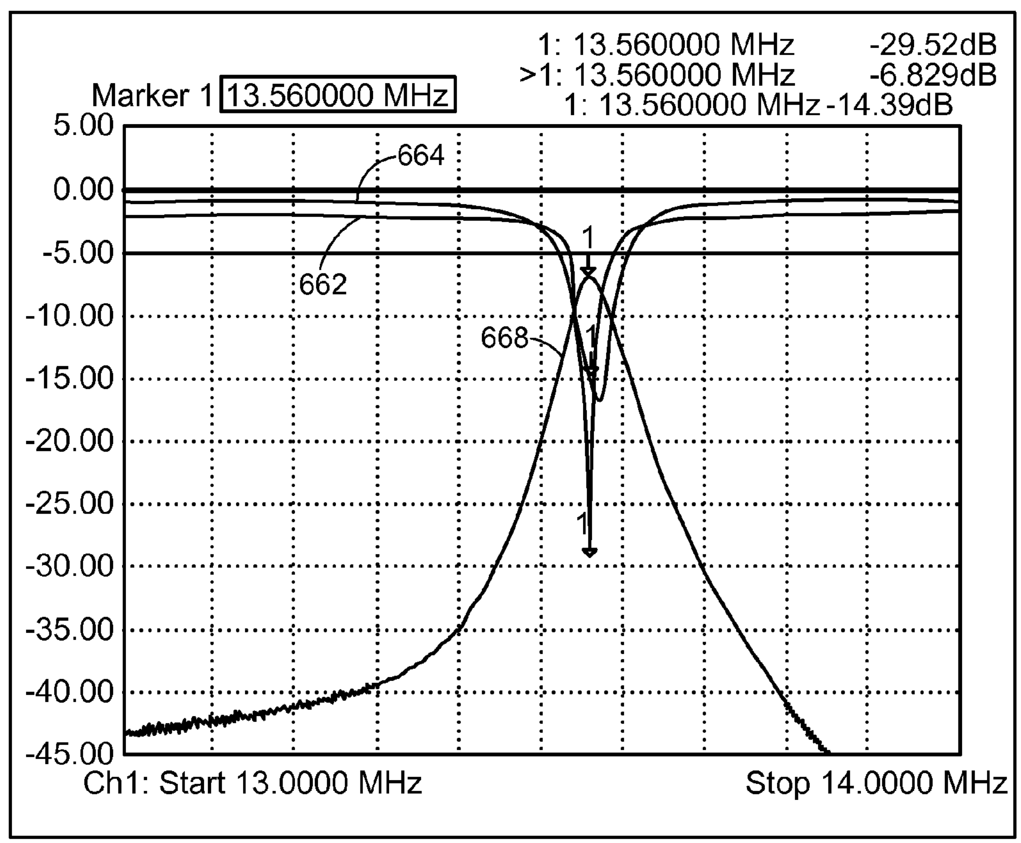
FIG. 13 shows simulation results indicating coupling strength between a transmit antenna, a repeater antenna and a receive antenna.

FIG. 13 shows simulation results indicating coupling strength between a transmit antenna, a repeater antenna and a receive antenna. The transmit antenna, the repeater antenna, and the receive antenna are tuned to have a resonant frequency of about 13.56 MHz.

Curve 662 illustrates a measure for the amount of power transmitted from the transmit antenna out of the total power fed to the transmit antenna at various frequencies. Similarly, curve 664 illustrates a measure for the amount of power received by the receive antenna through the repeater antenna out of the total power available in the vicinity of its terminals at various frequencies. Finally, Curve 668 illustrates the amount of power actually coupled between the transmit antenna, through the repeater antenna and into the receive antenna at various frequencies.

At the peak of curve 668, corresponding to about 13.56 MHz, it can be seen that a large amount of the power sent from the transmitter is available at the receiver, indicating a high degree of coupling between the combination of the transmit antenna, the repeater antenna and the receive antenna.

Figure 14A:
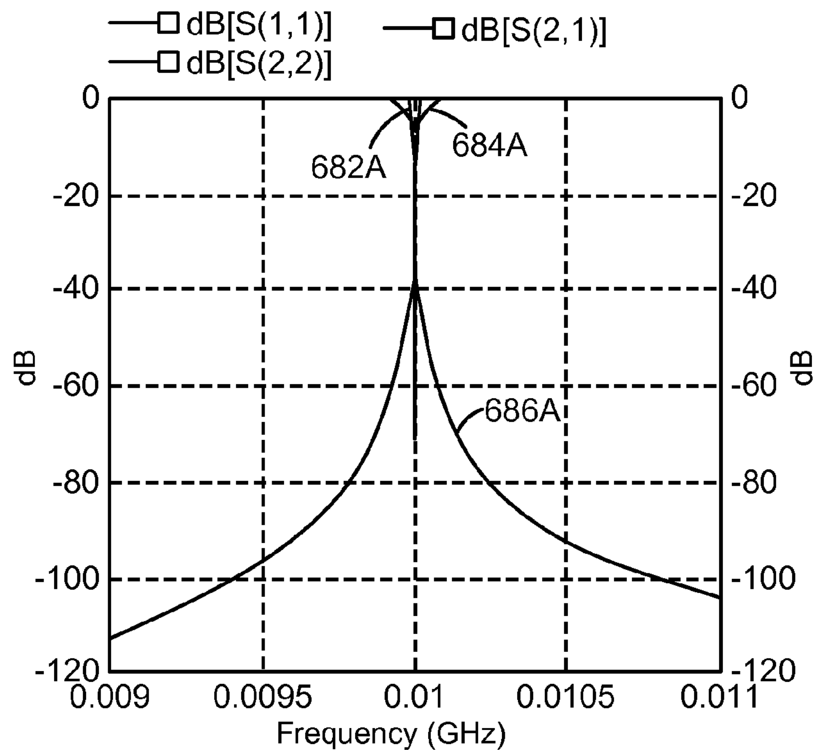
FIG. 14A shows simulation results indicating coupling strength between a transmit antenna and receive antenna with no repeater antennas.

FIG. 14A show simulation results indicating coupling strength between a transmit antenna and receive antenna disposed in a coaxial placement relative to the transmit antenna with no repeater antennas. The transmit antenna and the receive antenna are tuned to have a resonant frequency of about 10 MHz. The transmit antenna in this simulation is about 1.3 meters on a side and the receive antenna is a multi-loop antenna at about 30 mm on a side. The receive antenna is placed at about 2 meters away from the plane of the transmit antenna. Curve 682A illustrates a measure for the amount of power transmitted from the transmit antenna out of the total power fed to its terminals at various frequencies. Similarly, curve 684A illustrates a measure of the amount of power received by the receive antenna out of the total power available in the vicinity of its terminals at various frequencies. Finally, Curve 686A illustrates the amount of power actually coupled between the transmit antenna and the receive antenna at various frequencies.

Figure 14B:
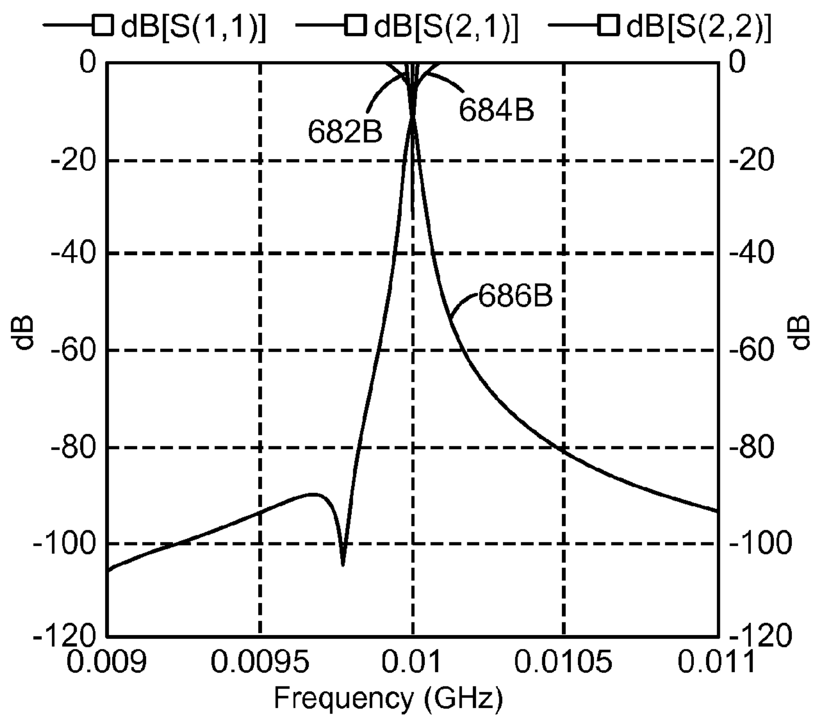
FIG. 14B shows simulation results indicating coupling strength between a transmit antenna and receive antenna with a repeater antenna.

FIG. 14B show simulation results indicating coupling strength between the transmit and receive antennas of FIG. 14A when a repeater antenna is included in the system. The transmit antenna and receive antenna are the same size and placement as in FIG. 14A. The repeater antenna is about 28 cm on a side and placed coplanar with the receive antenna (i.e., about 0.1 meters away from the plane of the transmit antenna). In FIG. 14B, Curve 682B illustrates a measure of the amount of power transmitted from the transmit antenna out of the total power fed to its terminals at various frequencies. Curve 684B illustrates the amount of power received by the receive antenna through the repeater antenna out of the total power available in the vicinity of its terminals at various frequencies. Finally, Curve 686B illustrates the amount of power actually coupled between the transmit antenna, through the repeater antenna and into the receive antenna at various frequencies.

When comparing the coupled power (686A and 686B) from FIGS. 14A and 14B it can be seen that without a repeater antenna the coupled power 686A peaks at about −36 dB. Whereas, with a repeater antenna the coupled power 686B peaks at about −5 dB. Thus, near the resonant frequency, there is a significant increase in the amount of power available to the receive antenna due to the inclusion of a repeater antenna.

Exemplary embodiments of the invention include low cost unobtrusive ways to properly manage how the transmitter radiates to single and multiple devices and device types in order to optimize the efficiency by which the transmitter conveys charging power to the individual devices.

Figure 15:
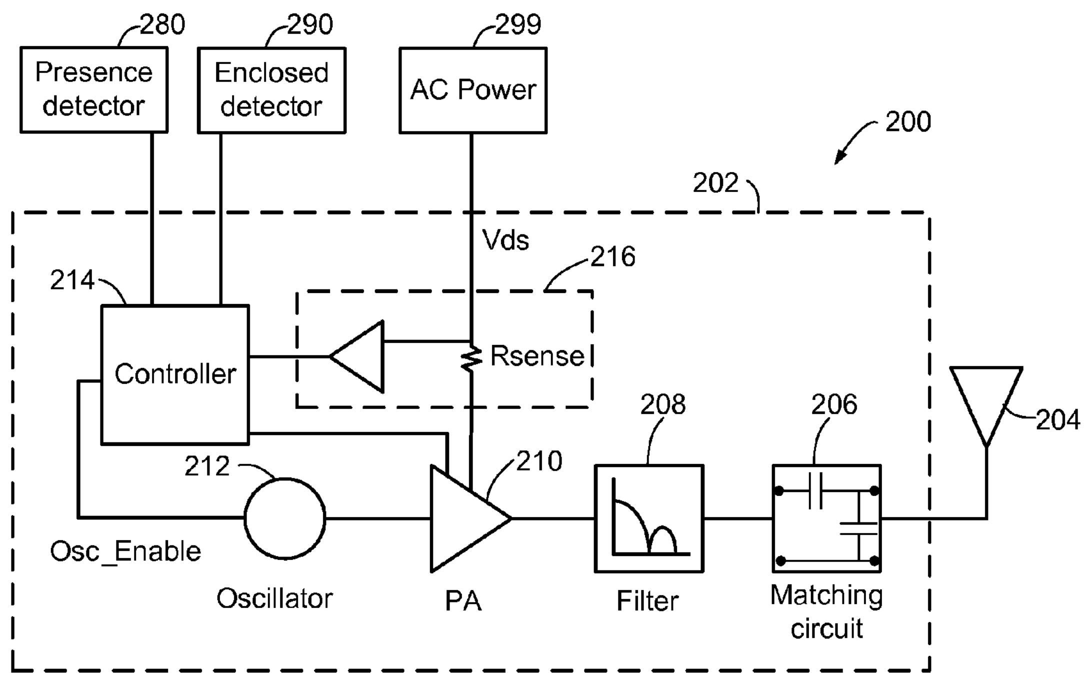
FIG. 15 is a simplified block diagram of a transmitter according to one or more exemplary embodiments of the present invention.

FIG. 15 is a simplified block diagram of a transmitter 200 including a presence detector 280. The transmitter is similar to that of FIG. 6 and, therefore, does not need to be explained again. However, in FIG. 15 the transmitter 200 may include presence detector 280, and enclosed detector 290, or a combination thereof, connected to the controller 214 (also referred to as a processor herein). The controller 214 can adjust an amount of power delivered by the amplifier 210 in response to presence signals from the presence detector 280 and enclosed detector 290. The transmitter may receive power through an AC-DC converter (not shown) to convert conventional AC power 299.

As a non-limiting example, the presence detector 280 may be a motion detector utilized to sense the initial presence of a device to be charged that is inserted into the coverage area of the transmitter. After detection, the transmitter is turned on and the RF power received by the device is used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

In many of the examples below, only one guest device is shown being charged. In practice, a multiplicity of the devices can be charged from a near-field generated by each host.

In exemplary embodiments, a method by which the Tx circuit does not remain on indefinitely may be used. In this case, the Tx circuit may be programmed to shut off after a user-determined amount of time. This feature prevents the Tx circuit, notably the power amplifier, from running long after the wireless devices in its perimeter are fully charged. This event may be due to the failure of the circuit to detect the signal sent from either the repeater or the Rx coil that a device is fully charged. To prevent the Tx circuit from automatically shutting down if another device is placed in its perimeter, the Tx circuit automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Exemplary embodiments of the invention include using surfaces as the charging stations or "hosts," housing totally, or partially, the transmit antenna and other circuitry necessary for wireless transfer of power to other often smaller devices, equipment, or machines referred to as "guests." As non-limiting examples, these charging stations or hosts could be a window, a wall, and so on. The charging system, which can be at least partially embedded in the aforementioned examples, may either be a retrofit to existing apparatus, or made as part of its initial design and manufacturing.

Electrically small antennas have low efficiency, often no more than a few percent as explained by the theory of small antennas. The smaller the electric size of an antenna, the lower is its efficiency. The wireless power transfer can become a viable technique replacing wired connection to the electric grid in industrial, commercial, and household applications if power can be sent over meaningful distances to the devices that are in the receiving end of such power transfer system. While this distance is application dependent, a few tens of a centimeter to a few meters can be deemed a suitable range for most applications. Generally, this range reduces the effective frequency for the electric power in the interval between 5 MHz to 100 MHz.

Figure 16:
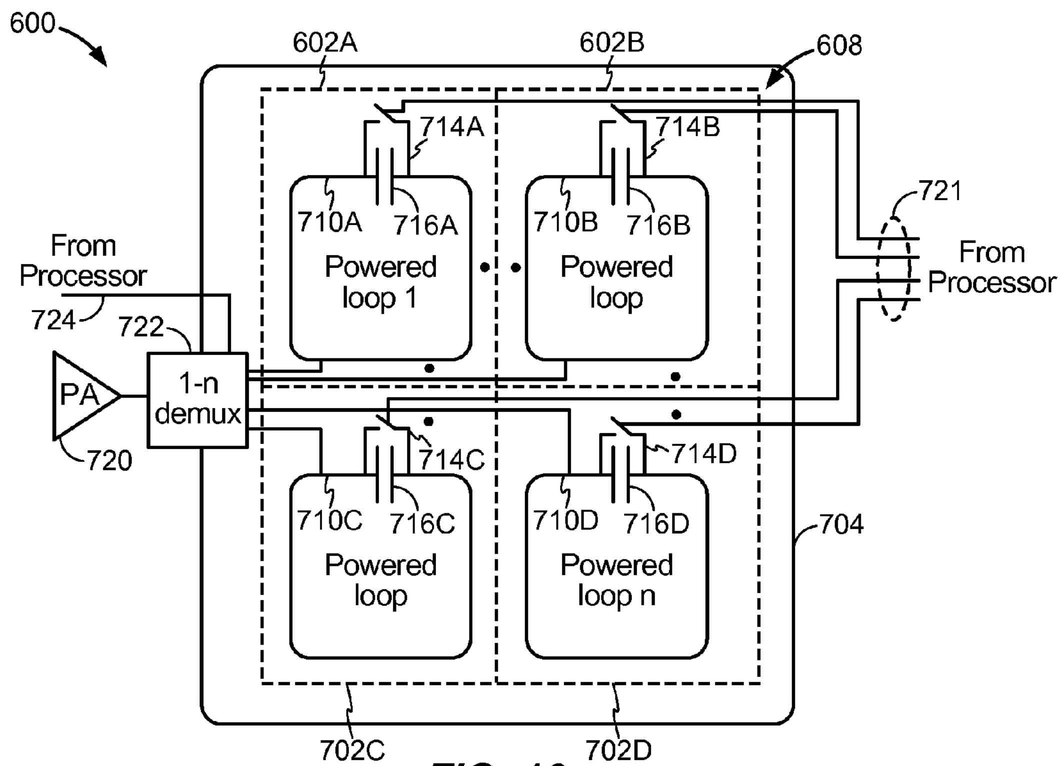
FIG. 16 is a simplified block diagram of an enlarged area wireless charging apparatus, in accordance with an exemplary embodiment of the present invention.
Figure 17:
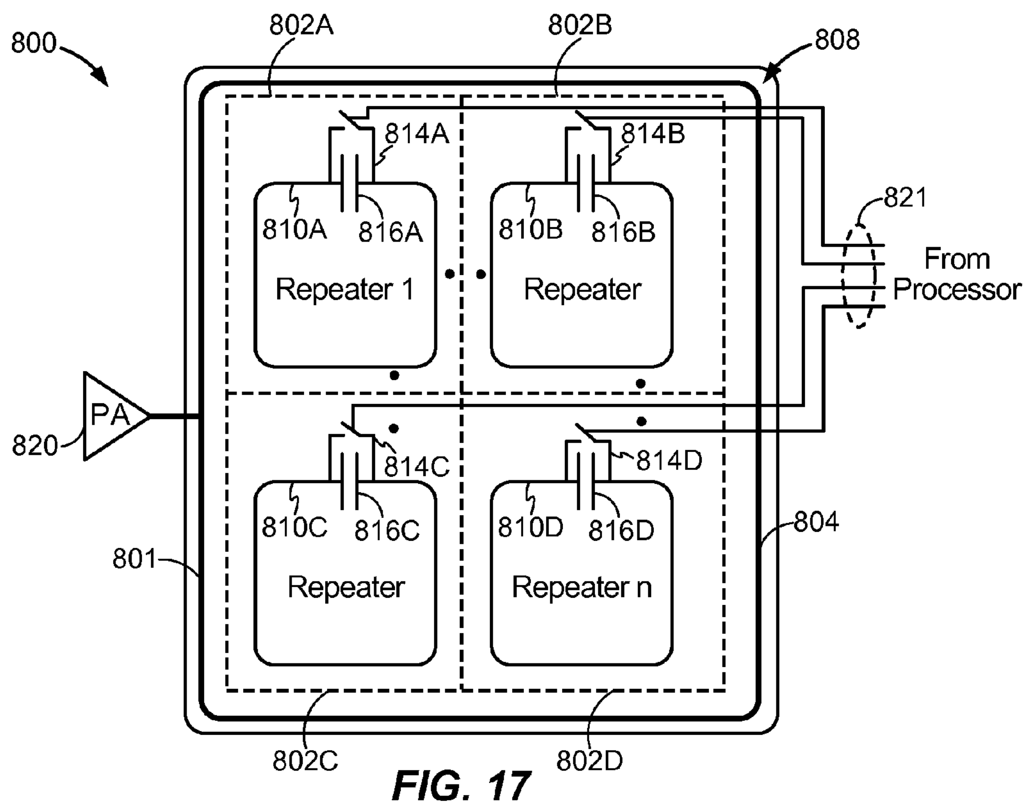
FIG. 17 is a simplified block diagram of an enlarged area wireless charging apparatus, in accordance with another exemplary embodiment of the present invention.

FIGS. 16 and 17 are plan views of block diagrams of an enlarged area wireless charging apparatus, in accordance with exemplary embodiments. As stated, locating a receiver in a near-field coupling mode region of a transmitter for engaging the receiver in wireless charging may be unduly burdensome by requiring accurate positioning of the receiver in the transmit antenna's near-field coupling mode region. Furthermore, locating a receiver in the near-field coupling mode region of a fixed-location transmit antenna may also be inaccessible by a user of a device coupled to the receiver especially when multiple receivers are respectively coupled to multiple user accessible devices (e.g., laptops, PDAs, wireless devices) where users need concurrent physical access to the devices. For example, a single transmit antenna exhibits a finite near-field coupling mode region. Accordingly, a user of a device charging through a receiver in the transmit antenna's near-field coupling mode region may require a considerable user access space that would be prohibitive or at least inconvenient for another user of another device to also wirelessly charge within the same transmit antenna's near-field coupling mode region and also require separate user access space. For example, two adjacent users of wireless chargeable devices seated at a conference table configured with a single transmit antenna may be inconvenienced or prohibited from accessing their respective devices due to the local nature of the transmitters near-field coupling mode region and the considerable user access space required to interact with the respective devices. Additionally, requiring a specific wireless charging device and its user to be specifically located may also inconvenience a user of the device.

Referring to FIG. 16, an exemplary embodiment of an enlarged area wireless charging apparatus 700 provides for placement of a plurality of adjacently located transmit antenna circuits 702A-702D to define an enlarged wireless charging area 708. By way of example and not limitation, a transmit antenna circuit includes a transmit antenna 710 having a diameter or side dimension, for example, of around 30-40 centimeters for providing uniform coupling to an receive antenna (not shown) that is associated with or fits in an electronic device (e.g., wireless device, handset, PDA, laptop, etc.). By considering the transmit antenna circuit 702 as a unit or cell of the enlarged area wireless charging apparatus 700, stacking or adjacently tiling these transmit antenna circuits 702A-702D next to each other on substantially a single planar surface 704 (e.g., on a table top) allows for increasing or enlarging the charging area. The enlarged wireless charging area 708 results in an increased charging region for one or more devices.

The enlarged area wireless charging apparatus 700 further includes a transmit power amplifier 720 for providing the driving signal to transmit antennas 710. In configurations where the near-field coupling mode region of one transmit antenna 710 interferes with the near-field coupling mode regions of other transmit antennas 710, the interfering adjacent transmit antennas 710 are "cloaked" to allow improved wireless charging efficiency of the activated transmit antenna 710.

The sequencing of activation of transmit antennas 710 in enlarged area wireless charging apparatus 700 may occur according to a time-domain based sequence. The output of transmit power amplifier 720 is coupled to a multiplexer 722 which time-multiplexes, according to control signal 724 from the transmitter processor, the output signal from the transmit power amplifier 720 to each of the transmit antennas 710.

In order to inhibit inducing resonance in adjacent inactive transmit antenna 710 when the power amplifier 720 is driving the active transmit antenna, the inactive antennas may be "cloaked" by altering the resonant frequency of that transmit antenna by, for example, activating the cloaking circuit 714. By way of implementation, concurrent operation of directly or nearly adjacent transmit antenna circuits 702 may result in interfering effects between concurrently activated and physically nearby or adjacent other transmit antenna circuits 702. Accordingly, transmit antenna circuit 702 may further include a transmitter cloaking circuit 714 for altering the resonant frequency of transmit antennas 710.

The transmitter cloaking circuit may be configured as a switching means (e.g. a switch) for shorting-out or altering the value of reactive elements, for example capacitor 716, of the transmit antenna 710. The switching means may be controlled by control signals 721 from the transmitter's processor. In operation, one of the transmit antennas 710 is activated and allowed to resonate while other of transmit antennas 710 are inhibited from resonating, and therefore inhibited from adjacently interfering with the activated transmit antenna 710. Accordingly, by shorting-out or altering the capacitance of a transmit antenna 710, the resonant frequency of transmit antenna 710 is altered to prevent resonant coupling from other transmit antennas 710. Other techniques for altering the resonant frequency are also contemplated.

In another exemplary embodiment, each of the transmit antenna circuits 702 can determine the presence or absence of receivers within their respective near-field coupling mode regions with the transmitter processor choosing to activate ones of the transmit antenna circuits 702 when receivers are present and ready for wireless charging or forego activating ones of the transmit antenna circuits 702 when receivers are not present or not ready for wireless charging in the respective near-field coupling mode regions. The detection of present or ready receivers may occur according to the receiver detection signaling protocol described herein or may occur according to physical sensing of receivers such as motion sensing, pressure sensing, image sensing or other sensing techniques for determining the presence of a receiver within a transmit antenna's near-field coupling mode region. Furthermore, preferential activation of one or more transmit antenna circuits by providing an enhanced proportional duty cycle to at least one of the plurality of antenna circuits is also contemplated to be within the scope of the present invention.

Referring to FIG. 17, an exemplary embodiment of an enlarged area wireless charging apparatus 800 provides for placement of a plurality of adjacently located repeater antenna circuits 802A-802D inside of a transmit antenna 801 defining an enlarged wireless charging area 808. Transmit antenna 801, when driven by transmit power amplifier 820, induces resonant coupling to each of the repeater antennas 810A-810D. By way of example and not limitation, a repeater antenna 810 having a diameter or side dimension, for example, of around 30-40 centimeters provides uniform coupling to a receive antenna (not shown) that is associated with or affixed to an electronic device. By considering the repeater antenna circuit 802 as a unit or cell of the enlarged area wireless charging apparatus 800, stacking or adjacently tiling these repeater antenna circuits 802A-802D next to each other on substantially a single planar surface 804 (e.g., on a table top) allows for increasing or enlarging the charging area. The enlarged wireless charging area 808 results in an increased charging space for one or more devices.

The enlarged area wireless charging apparatus 800 includes transmit power amplifier 820 for providing the driving signal to transmit antenna 801. In configurations where the near-field coupling mode region of one repeater antenna 810 interferes with the near-field coupling mode regions of other repeater antennas 810, the interfering adjacent repeater antennas 810 are "cloaked" to allow improved wireless charging efficiency of the activated repeater antenna 810.

The sequencing of activation of repeater antennas 810 in enlarged area wireless charging apparatus 800 may occur according to a time-domain based sequence. The output of transmit power amplifier 820 is generally constantly coupled (except during receiver signaling as described herein) to transmit antenna 801. In the present exemplary embodiment, the repeater antennas 810 are time-multiplexed according to control signals 821 from the transmitter processor. By way of implementation, concurrent operation of directly or nearly adjacent repeater antenna circuits 802 may result in interfering effects between concurrently activated and physically nearby or adjacent other repeater antennas circuits 802. Accordingly, repeater antenna circuit 802 my further include a repeater cloaking circuit 814 for altering the resonant frequency of repeater antennas 810.

The repeater cloaking circuit may be configured as a switching means (e.g. a switch) for shorting-out or altering the value of reactive elements, for example capacitor 816, of the repeater antenna 810. The switching means may be controlled by control signals 821 from the transmitter's processor. In operation, one of the repeater antennas 810 is activated and allowed to resonate while other of repeater antennas 810 are inhibited from resonating, and therefore adjacently interfering with the activated repeater antenna 810. Accordingly, by shorting-out or altering the capacitance of a repeater antenna 810, the resonant frequency of repeater antenna 810 is altered to prevent resonant coupling from other repeater antennas 810. Other techniques for altering the resonant frequency are also contemplated.

In another exemplary embodiment, each of the repeater antenna circuits 802 can determine the presence or absence of receivers within their respective near-field coupling mode regions with the transmitter processor choosing to activate ones of the repeater antenna circuits 802 when receivers are present and ready for wireless charging or forego activating ones of the repeater antenna circuits 802 when receivers are not present or not ready for wireless charging in the respective near-field coupling mode regions. The detection of present or ready receivers may occur according to the receiver detection signaling protocol described herein or may occur according to physical sensing of receivers such as motion sensing, pressure sensing, image sensing or other sensing techniques for determining a receiver to be within a repeater antenna's near-field coupling mode region.

The various exemplary embodiments of the enlarged area wireless charging apparatus 700 and 800 may further include time domain multiplexing of the input signal being coupled to transmit/repeater antennas 710, 810 based upon asymmetrically allocating activation time periods to the transmit/repeater antennas based upon factors such as priority charging of certain receivers, varying quantities of receivers in different antennas' near-field coupling mode regions, power requirements of specific devices coupled to the receivers as well as other factors.

It is known that electrically small antennas have low efficiency, often no more than a few percent as explained by the theory of small antennas, known by those of skill in the art. Generally, the smaller the electric size of an antenna, the lower is its efficiency. Accordingly, wireless power transfer can become a viable technique replacing wired connection to the electric grid in industrial, commercial, and household applications if power can be sent over meaningful distances to the devices that are in the receiving end of such power transfer system. While this distance is application dependent, a few tens of a centimeter to a few meters, for example, can be deemed a suitable range for most applications. Generally, this range reduces the effective frequency for the electric power in the interval, for example, between 5 MHz to 100 MHz.

As stated, efficient transfer of energy between the transmitter and receiver occurs during matched or nearly matched resonance between the transmitter and the receiver. However, even when resonance between the transmitter and receiver are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

FIGS. 16 and 17 illustrate multiple loops in a charging area that is substantially planar. However, exemplary embodiments of the present invention are not so limited. Three-dimensional spaces with multiple antennas may be used.

Exemplary embodiments of the invention include a wireless receiver configured to decouple from a chargeable element upon determining that the chargeable element is fully-charged. The receivers, which can be at least partially embedded in, for example, a low power device, may either retrofit to an existing chargeable device, or made as part of its initial design and manufacturing. Further, exemplary embodiments of the invention include a charging device having an interface configured to enable a user to define a time duration of a charging period.

Figure 18:
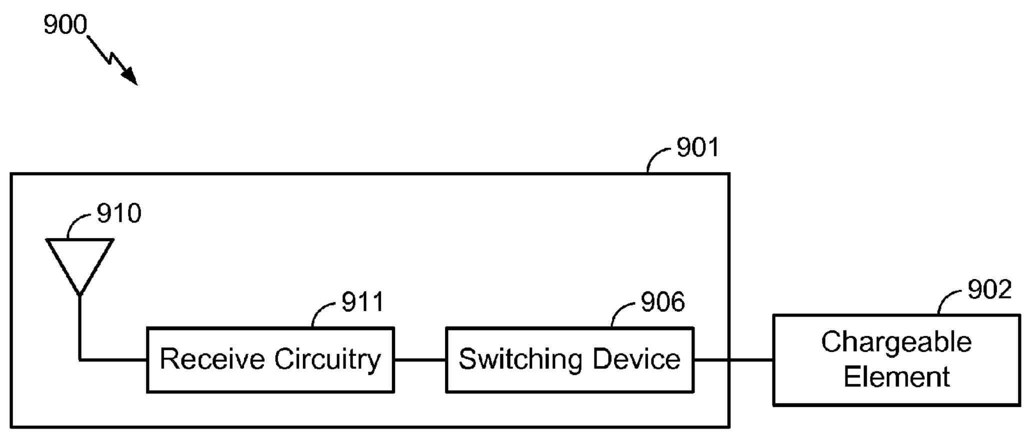
FIG. 18 is a block diagram of a wireless receiver system, according to an exemplary embodiment of the present invention.

FIG. 18 is a simplified block diagram of a wireless receiver system 900, in accordance with an exemplary embodiment of the present invention. Wireless receive system 900 includes a wireless receiver 901 having a receive antenna 910, receive circuitry 911, and a switching device 906. Receive antenna 910 may be configured to receive wireless power from a wireless transmitter. Switching device 906 may comprise any known and suitable electrical switching device. For example only, switching device 906 may comprise a Field Effect Transistor (FET). Further, wireless receiver system 900 includes a chargeable element 902 selectively coupled to wireless receiver 901 via switching device 906. Wireless receiver 901 may be configured to convey power to chargeable element 902. For example only and not by way of limitation, chargeable element 902 may comprise a battery, a storage capacitor, or any combination thereof. It should be noted that although switching device 906 is depicted as being internal to wireless receiver 901, switching device 906 may be external to wireless receiver 901 and coupled between wireless receiver 901 and chargeable element 902. Furthermore, it should be noted that although switching device 906 is illustrated as being coupled between receive circuitry 911 and chargeable element 902, switching device 906 may be coupled anywhere between receive antenna 910 and chargeable element 902. Generally, energy is propagated wirelessly to receive antenna 910 and then coupled through receive circuitry 911 to chargeable element 902. By way of example only, wireless receiver 901 may be configured to be integrated within or coupled to a low power device, such as, for example only, a Bluetooth headset or a hearings aid.

Figure 19:
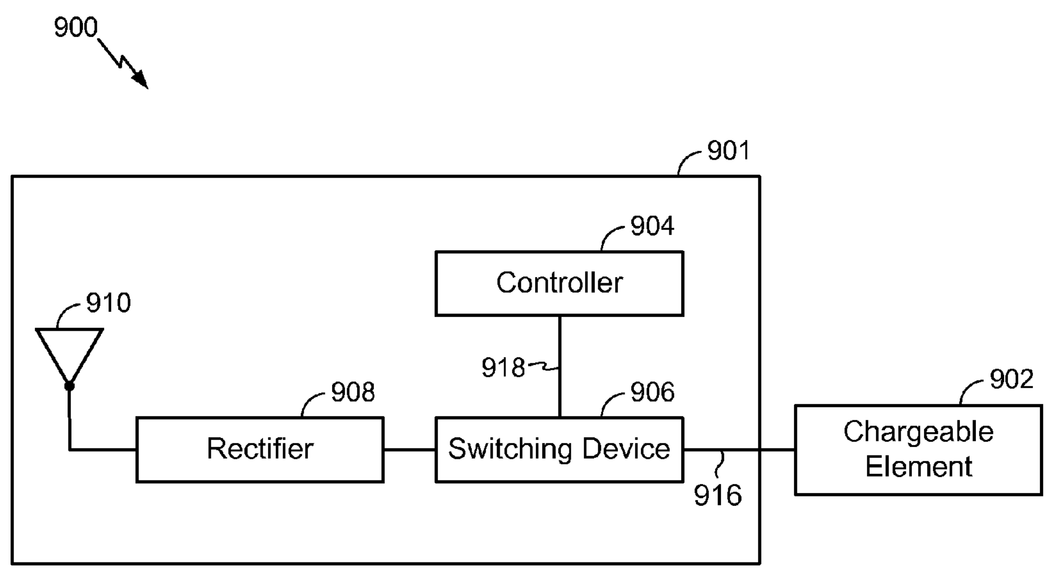
FIG. 19 is another block diagram of the wireless receiver system of FIG. 22, according to an exemplary embodiment of the present invention.

FIG. 19 illustrates another, more specific block diagram of wireless receiver system 900, in accordance with an exemplary embodiment of the present invention. As illustrated, receive antenna 910 may be operably coupled to a rectifier 908 of receive circuitry 911 (see FIG. 18). Furthermore, rectifier 908 may coupled to chargeable element 902, via switching device 906, and may be configured to receive power from receive antenna 910 and supply a power signal 916 to chargeable element 902.

Wireless receiver 901 may also include a controller 904, which may be operably coupled to switching device 906 via bus 918. Controller 904 may be any suitable controller and may be configured to monitor a charging level status of chargeable element 902 (e.g., fully-charged or less than fully-charged) by any known and suitable manner. For example only and, as described more fully below, controller 904 may be configured to monitor a status of a charging level of chargeable element 902 by means of a current sensor, a voltage sensor, or any combination thereof, operably coupled between receive antenna 910 and chargeable element 902.

Figure 20:
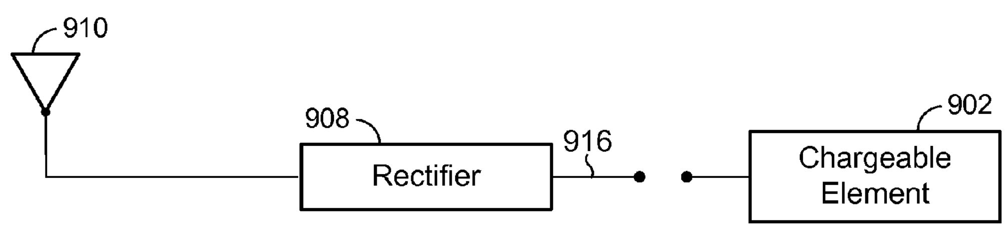
FIG. 20 illustrates the wireless receiver system of FIGS. 22 and 23 wherein a receive antenna is electrically isolated from a chargeable element, according to an exemplary embodiment of the present invention.
Figure 21:
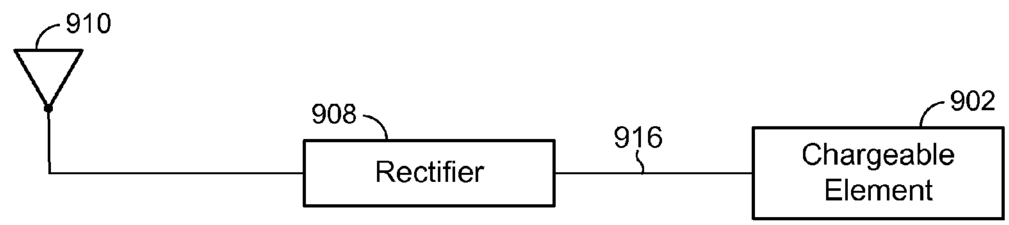
FIG. 21 illustrates the wireless receiver system of FIGS. 22 and 23 wherein a receive antenna is operably coupled a chargeable element, according to an exemplary embodiment of the present invention.

Moreover, controller 904 may be configured to electrically isolate receive antenna 910 from chargeable element 902, via switching device 906, in the event that chargeable element 902 reaches a fully charged state. More specifically, controller 904 may be configured to transmit one or more control signals via bus 918 to switching device 906 to control a configuration of switching device 906. For example, controller 904 may be configured to transmit one or more control signals to switching device 906 to "open" switching device 906 and, thus, disconnect receive antenna 910 from chargeable element 902. FIG. 20 illustrates wireless receiver system 900 wherein switching device 906 is open creating an "open state" and, thus, receive antenna 910 is disconnected from chargeable element 902. Moreover, for example, controller 904 may be configured to transmit one or more control signals to switching device 906 to "close" switching device 906 and, thus, enable a connection between receive antenna 910 and chargeable element 902. FIG. 21 illustrates wireless receiver system 900 wherein switching device 906 is closed and, thus, receive antenna 910 is connected to chargeable element 902 creating a normal receive mode wherein power can be supplied by power signal 916 to chargeable element 902 (also referred to herein as a "charging state").

Figure 22:
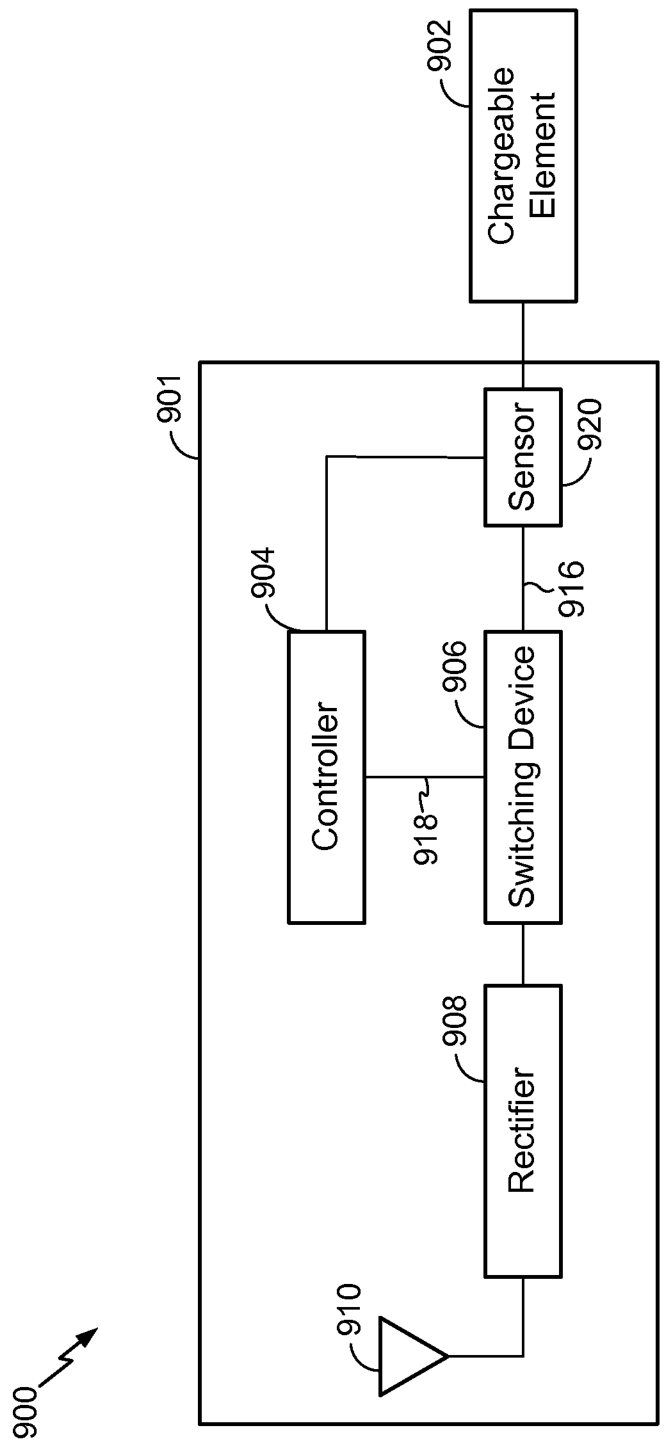
FIG. 22 is yet another block diagram of the wireless receiver system of FIGS. 22 and 23 having a sensor operably coupled between a receive antenna and a chargeable element, according to an exemplary embodiment of the present invention.
Figure 23:
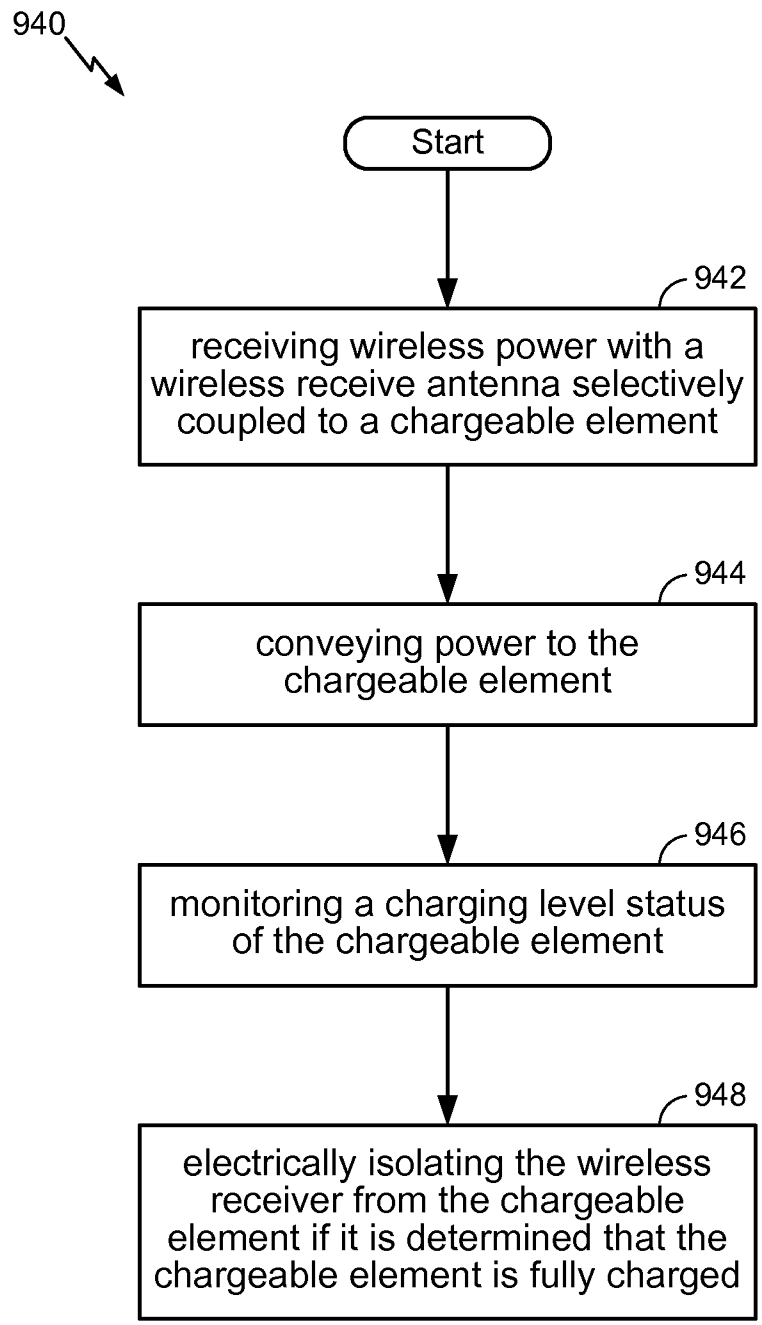
FIG. 23 is a flowchart illustrating a method, according to an exemplary embodiment of the present invention.

FIG. 22 illustrates yet another block diagram of wireless receiver system 900, wherein a sensor 920 is operably coupled between receive antenna 910 and chargeable element 902. According to one exemplary embodiment, sensor 920 may be configured to sense an amount of current being supplied to chargeable element 902, sense a voltage on power signal 916, or any combination thereof. Moreover, upon sensing a voltage, a current, or any combination thereof, sensor 920 may be configured to transmit a status signal to controller 904 indicative of a parameter sensed by sensor 920. For example, sensor 920 may be configured to transmit a status signal to controller 904 indicative of an amount of current being supplied to chargeable element 902 via power signal 916, an amount of voltage on power signal 916, or both. Upon receipt of a status signal from sensor 920, controller 904 may be configured to determine a charging level status of chargeable element 902. In the event controller 904 determines that chargeable element 902 is in a fully-charged state, controller 904 may transmit one or more control signals to switching device 906 to "open" switching device 906 and, thus, electrically isolate receive antenna 910 from chargeable element 902.

With reference to FIGS. 18-23, a contemplated method 940 (see FIG. 23) of operating a wireless receiver system will now be described. Method 940 of operating a wireless receiver system may include receiving wireless power with a wireless receive antenna selectively coupled to a chargeable element (depicted by numeral 942). More specifically, wireless power transmitted from at least one wireless transmit antenna (e.g., transmit antenna 114 depicted in FIG. 2) may be received by one or more receive antennas including receive antenna 910 of wireless receiver 901, which is positioned within a near-field region of the at least one transmit antenna. Method 940 may further include conveying power to the chargeable element (depicted by numeral 944). More specifically, upon receipt of wireless power, wireless receiver 901 may convey power to chargeable element 902 via rectifier 908.

Moreover, method 940 may include monitoring a charging level status of the chargeable element (depicted by numeral 946). More specifically, controller 904 may monitor a charging level status of chargeable element 902 in any known and suitable manner. Furthermore, method 940 may include electrically isolating the wireless receiver from the chargeable element if it is determined that the chargeable element is fully charged (depicted by numeral 948). More specifically, upon determining that chargeable element 902 is fully charged, controller 904 may send a control signal to switching device 906 to electrically isolate receive antenna 910 from chargeable element 902.

Figure 24:
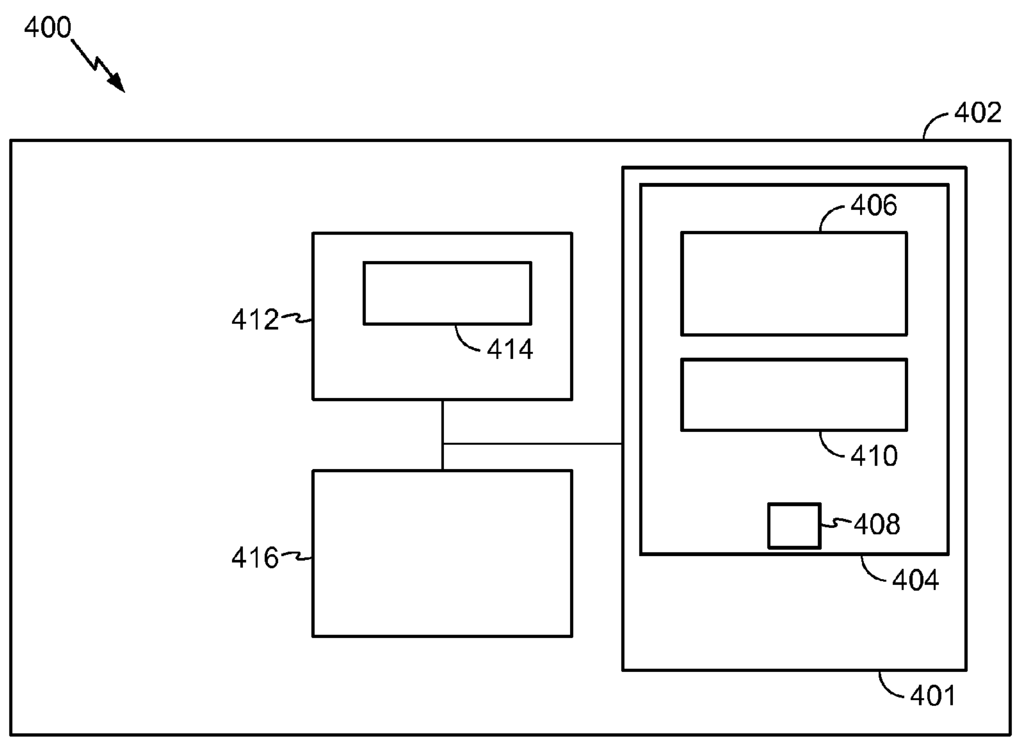
FIG. 24 depicts a block diagram of a wireless charging system including a wireless charging device, in accordance with an exemplary embodiment of the present invention.

FIG. 24 depicts a block diagram of a wireless charging system 400 including a wireless charging device 402, in accordance with an exemplary embodiment of the present invention. Charging device 402 may be configured to wirelessly charge at least one electronic device positioned thereon or proximate thereto. More specifically, charging device 402 may include at least one transmit antenna (e.g., transmit antenna 114 depicted in FIG. 2) configured to wirelessly transmit power to a receive antenna (e.g., receive antenna 118 depicted in FIG. 2) and an associated receiver (e.g., receiver 108 depicted in FIG. 2) coupled to a chargeable element (e.g., battery 136 depicted in FIG. 2) of an electronic device. Upon receipt of the wirelessly transmitted power at the receive antenna and the associated receiver, power may be supplied to the chargeable element of the electronic device. Wireless charging of an electronic device has been discussed in detail above and, therefore, will not be described any further.

As illustrated in FIG. 24, charging device 402 includes a user interface 401. User interface 401 may include an input/output (I/O) module 404 and may be configured to accept inputs and commands and to present outputs. I/O module 404 may include any known and suitable switches, buttons, dials, keypads, the like, or any combination thereof. As a more specific example, according to one exemplary embodiment, I/O module 404 may include an on/off switch 408 configured for enabling a user to turn on charging device 402 or turn off charging device 402. Furthermore, I/O module 404 may include a display device 406, which may comprise, for example only, a touch screen device having multi-touch interactive capabilities to allow a device user to directly interact with charging device 402 in order to communicate a command to charging device 402. I/O module 404 may also include a timer I/O device 410 configured for enabling a user to program a desired time duration of a charging period. It is noted that a user may program charging device 402 to operate (i.e., to transmit wireless power) for any suitable time duration. By way of example and not limitation, charging device 402 may be programmed to operate for 30 minutes, 60 minutes, 90 minutes or 120 minutes.

Moreover, charging device 402 may include a timing module 412 operably coupled to user interface 401 and a controller 416. Timing module 412 may include a timing device 414 configured to clock a time duration of a charging period. Timing device 414 may comprise any known and suitable timing device configured to track time through an internal clock, such as an oscillator. Furthermore, controller 416 may be any suitable controller and may be configured to monitor operation of timing module 412 and timing device 414. Further, controller 416 may be configured to discontinue the wireless transmission of power from charging device 402 upon completion of a desired charging period time duration. Controller 416 may also be configured to monitor an amount of current being drawn from charging device 402 and, if the amount of current being drawn drops below a specific level, controller 416 may be configured to discontinue the wireless transmission of power from charging device 402.

It is further noted that charging device 402 may comprise any physical configuration so as to enable one or more electronic devices to be placed within a charging region. For example, charging device 402 may be configured in a manner so as to have a substantially horizontal surface configured for one or more electronic devices to be placed thereon. As another example, charging device 402 may include a ledge configured for placement of one or more electronic devices. It is further noted that each charging device as described herein may be implemented as, for example only, a portable charging device such as a backpack, a briefcase, a purse, clothing, luggage, etc. Furthermore, each charging device described herein may be implemented as, for example, a stationary charging device such as a table, a desk, or any other stationary furniture.

Figure 25:
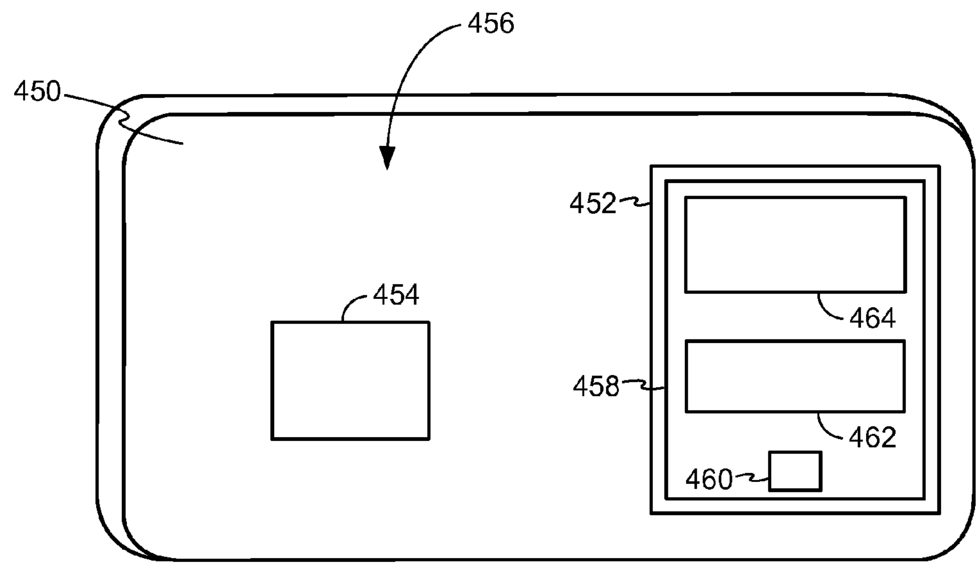
FIG. 25 illustrates an example of a charging device having at least one interface, according to an exemplary embodiment of the present invention.

FIG. 25 illustrates an example of a charging device (i.e., charging device 402) having at least one interface, according to an exemplary embodiment of the present invention. Charging device 450, as depicted in FIG. 25, may be configured to wirelessly charge at least one electronic device (e.g., electronic device 454) being positioned within a charging region 456. More specifically, charging device 450 may include at least one transmit antenna (e.g., transmit antenna 114 depicted in FIG. 2) configured to wirelessly transmit power to a receive antenna (e.g., receive antenna 118 depicted in FIG. 2) and an associated receiver (e.g., receiver 108 depicted in FIG. 2) coupled to a battery (e.g., battery 136 depicted in FIG. 2) of an electronic device positioned within charging region 456.

As illustrated in FIG. 25, charging device 450 includes a user interface 452 positioned on a surface of charging device 450. User interface 452 includes an I/O module 458 and may be configured to accept inputs and commands and to present outputs. I/O module 458 may include any known and suitable switches, buttons, dials, keypads, the like, or any combination thereof. In this example, I/O module 458 includes an on/off switch 460. I/O module 458 may also include a timer I/O device 462 configured for enabling a user to program a desired time duration of a charging period. Furthermore, I/O module 458 includes a display device 464, which may comprise, for example only, a touch screen device having multi-touch interactive capabilities to allow a device user to directly interact with charging device 450 in order to communicate a command to charging device 450. For example, display device 464 may be configured to display text indicative of a desired charging period time duration, which was programmed by a user. As another example, display device 464 may be configured to display text indicative of an amount of time remaining in a charging period.

Figure 26:
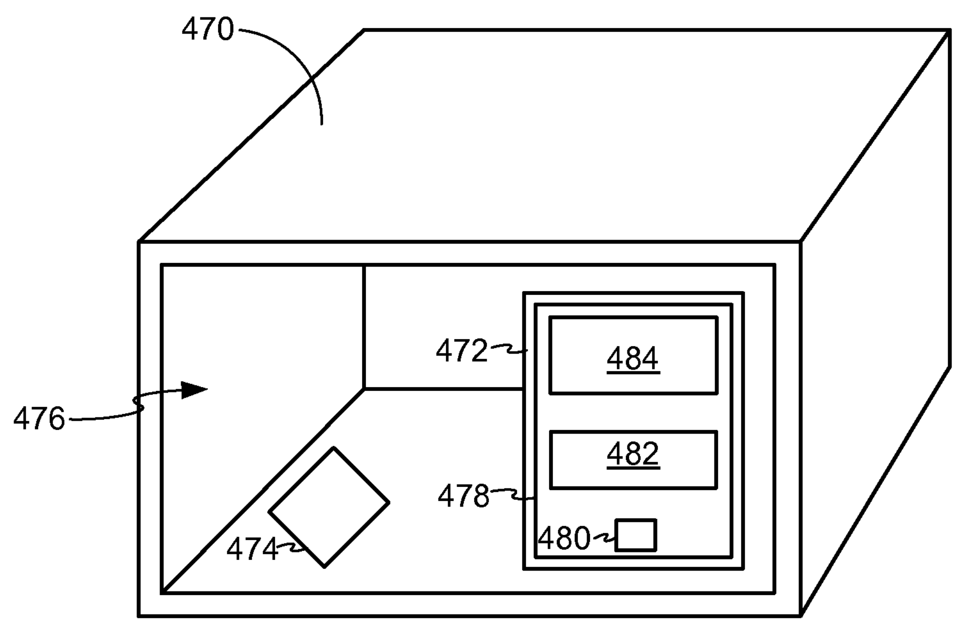
FIG. 26 illustrates another example of a charging device having at least one interface, in accordance with an exemplary embodiment of the present invention.
Figure 27:
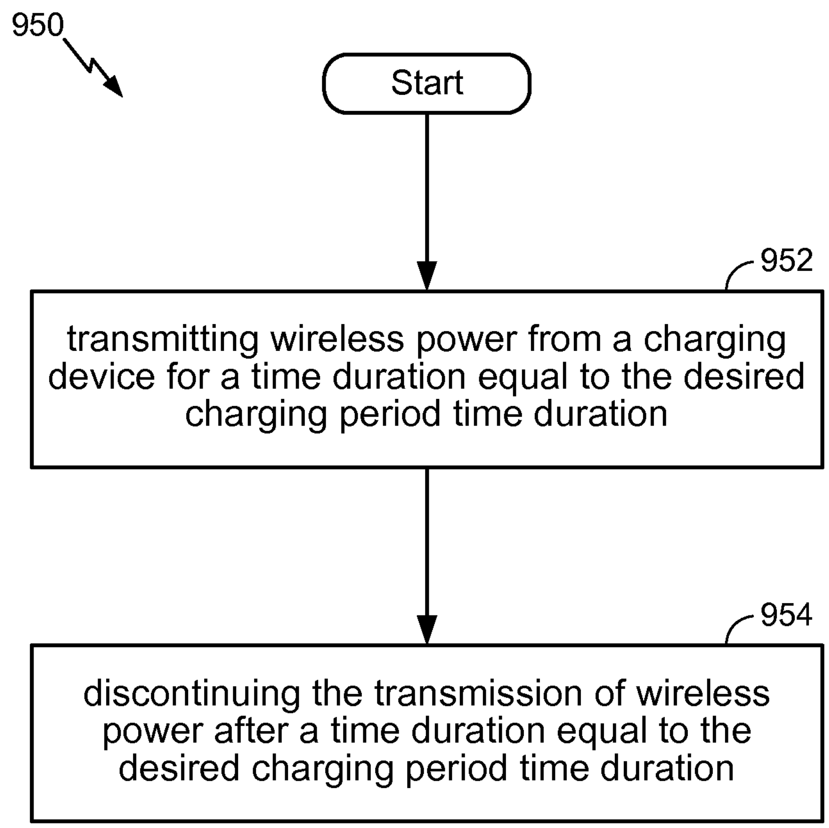
FIG. 27 is a flowchart illustrating another method, according to an exemplary embodiment of the present invention.

FIG. 26 illustrates another example of a charging device (i.e., charging device 402) having at least one interface, according to an exemplary embodiment of the present invention. Charging device 470, as depicted in FIG. 26, may be configured to wirelessly charge at least one electronic device (e.g., electronic device 474) being positioned within an internal charging region 476. More specifically, charging device 470 may include at least one transmit antenna (e.g., transmit antenna 114 depicted in FIG. 2) configured to wirelessly transmit power to a receive antenna (e.g., receive antenna 118 depicted in FIG. 2) and an associated receiver (e.g., receiver 108 depicted in FIG. 2) coupled to a battery (e.g., battery 136 depicted in FIG. 2) of an electronic device positioned within internal charging region 476.

As illustrated in FIG. 26, charging device 470 includes a user interface 472 positioned on an external surface of charging device 470. User interface 472 includes an I/O module 478 and may be configured to accept inputs and commands and to present outputs. I/O module 478 may include any known and suitable switches, buttons, dials, keypads, the like, or any combination thereof. In this example, I/O module 478 includes an on/off switch 480. I/O module 478 may also include a timer I/O device 482 configured for enabling a user to program a desired time duration of a charging period. Furthermore, I/O module 478 includes a display device 484, which may comprise, for example only, a touch screen device having multi-touch interactive capabilities to allow a device user to directly interact with charging device 470 in order to communicate a command to charging device 470. For example, display device 484 may be configured to display text indicative of a desired charging period time duration, which was programmed by a user. As another example, display device 484 may be configured to display text indicative of an amount of time remaining in a charging period.

With reference to FIGS. 24-27, a contemplated method 950 (see FIG. 27) of operating a charging device will now be described. Method 950 of operating a charging device may include transmitting wireless power from the charging device for a time duration equal to a desired charging period time duration (depicted by numeral 952). More specifically, a user may turn on charging device 402/450/470 via on/off switch 408/460/480 and then may enter, via user interface 401/452/472, a desired charging period time duration for charging device 402/450/470. Furthermore, charging device 402/450/470 may wireless power transmitted from at least one associated wireless transmit antenna (e.g., transmit antenna 114 depicted in FIG. 2) for a time duration equal to the user-defined charging period time duration.

Moreover, method 950 may include discontinuing the transmission of wireless power after a time duration equal to the desired charging period time duration (depicted by numeral 954). More specifically, a time duration of a charging period may be clocked by timing device 414 and monitored by controller 416. Furthermore, when the duration of the charging period is substantially equal to the desired charging period time duration, controller 416 may cease the transmission of wireless power from charging device 402/450/470.

Various exemplary embodiments of the present invention, as described above, may enable for wireless charging of low power devices in a convenient manner with little risk of damage to the low power devices. Furthermore, because a switching device (e.g., switching device 906) may be configured to handle high voltages and high currents, may be configured to exhibit low capacitance and low resistive loss, and may have small unit-to-unit variations in terminal characteristics, exemplary embodiments described above may be implemented without substantial cost or added complexity. Moreover, because low power devices may operate a parasitical device and may typically extract less than one percent of wireless power transmitted from a wireless transmit antenna, low power devices may be charged simultaneously with high power devices without a need to cloak the low power device and without substantially impacting the wireless charging of the high power devices. Additionally, other various exemplary embodiments of the present invention, as described above, enable for wireless charging for a programmable time duration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

The invention claimed is:

1. A wireless charging device, comprising:

an antenna configured to wirelessly transmit power simultaneously to a first chargeable device and a second chargeable device at a level sufficient to charge or power the first and the second chargeable devices;

a user interface configured to receive a user input indicating a desired duration of a charging period for wirelessly transmitting power via the antenna to each one of the first and second chargeable devices;

a timer configured to track time during the charging period; and a controller configured to deactivate the wireless transmission of power via the antenna to the first and second chargeable devices when the charging period is equal to the desired duration.

2. The charging device of claim 1, wherein the user interface comprises a touch-screen display device, and wherein the user input indicating the desired duration is received via the touch-screen display device.

3. The charging device of claim 1, wherein the desired duration is 30 minutes, 60 minutes, 90 minutes, or 120 minutes.

4. The charging device of claim 1, wherein the user interface comprises an on/off switch configured to allow a user to activate or deactivate the wireless transmission of power via the antenna to at least one of the first and the second chargeable devices.

5. The charging device of claim 1, wherein the user interface is configured to display an indication of the desired duration of the charging period.

6. The charging device of claim 1, wherein the user interface is configured to display an indication of an amount of time remaining within the desired duration of the charging period.

7. The device of claim 1, further comprising a transmit circuit configured to drive the antenna, and wherein the controller is further configured to:

monitor an amount of current being drawn from the transmit circuit; and deactivate the wireless transmission of power to at least one of the first and the second chargeable devices if the amount of current is below a threshold.

8. The device of claim 1, wherein the chargeable devices comprise a hearing aid or a Bluetooth headset, and wherein the wireless charging device comprises a portable wireless charging device or a stationary wireless charging device.

9. The charging device of claim 1, wherein the first chargeable device is a high power device and the second chargeable device is a low power device.

10. The charging device of claim 9, wherein the desired duration is related to the low power device.

11. A method for charging via a wireless charging device, the method comprising:

wirelessly transmitting power simultaneously to a first chargeable device and a second chargeable device via an antenna at a level sufficient to charge or power the first and the second chargeable devices;

receiving a user input indicating a desired duration of a charging period for wirelessly transmitting power via the antenna to each one of the first and second chargeable devices via a user interface;

deactivating the wireless transmission of power via the antenna to the first and second chargeable devices when the charging period is equal to the desired duration.

12. The method of claim 11, wherein receiving the user input via the user interface comprises receiving the user input via a touch-screen display device.

13. The method of claim 11, wherein the desired duration is 30 minutes, 60 minutes, 90 minutes, or 120 minutes.

14. The method of claim 11, further comprising activating or deactivating the wireless transmission of power based on input received via an on/off switch.

15. The method of claim 11, further comprising displaying an indication of the desired duration of the charging period via the user interface.

16. The method of claim 11, further comprising displaying an indication of an amount of time remaining within the desired duration of the charging period via the user interface.

17. The method of claim 11, further comprising:

monitoring an amount of current being drawn from a transmit circuit driving the antenna; and deactivating the wireless transmission of power if the amount of current is below a threshold.

18. The method of claim 11, wherein the chargeable devices comprise a hearing aid or a Bluetooth headset, and wherein the wireless charging device comprises a portable wireless charging device or a stationary wireless charging device.

19. A wireless charging device, the device comprising:

means for wirelessly transmitting power simultaneously to a first chargeable device and a second chargeable device at a level sufficient to charge or power the first and the second chargeable devices;

means for receiving a user input indicating a desired duration of a charging period for wirelessly transmitting power to each one of the first and second chargeable devices; and means for deactivating the wireless transmission of power to the first and second chargeable devices when the charging period is equal to the desired duration.

20. The wireless charging device of claim 19, wherein the means for receiving the user input comprises means for receiving the user input via a touch-screen display device.

21. The wireless charging device of claim 19, wherein the desired duration is 30 minutes, 60 minutes, 90 minutes, or 120 minutes.

22. The wireless charging device of claim 19, further comprising means for activating or deactivating the wireless transmission of power based on another user input.

23. The wireless charging device of claim 19, further comprising means for displaying an indication of the desired duration of the charging period.

24. The wireless charging device of claim 19, further comprising means for displaying an indication of an amount of time remaining within the desired duration of the charging period.

25. The wireless charging device of claim 19, further comprising:

means for monitoring an amount of current being drawn from a transmit circuit driving the means for wirelessly transmitting power; and means for deactivating the wireless transmission of power if the amount of current is below a threshold.

26. The wireless charging device of claim 19, wherein the chargeable devices comprise a hearing aid or a Bluetooth headset, and wherein the wireless charging device comprises a portable wireless charging device or a stationary wireless charging device.

27. The wireless charging device of claim 19, wherein the means for wirelessly transmitting power comprises an antenna, wherein the means for receiving a user input comprises a user interface, and wherein the means for deactivating the wireless transmission of power comprises a controller.

* * * * *